US012679003B2

(12) United States Patent
Meyer et al.

(10) Patent No.: US 12,679,003 B2
(45) Date of Patent: Jul. 14, 2026

(54) DEVICE FOR IMPREGNATING FIBERS WITH A DEFINED FIBER VOLUME CONTENT

(71) Applicant: BASF SE, Ludwigshafen am Rhein (DE)

(72) Inventors: Andre Meyer, Lemfoerde (DE); Andreas Emge, Lemfoerde (DE); Michael Hasenpatt, Lemfoerde (DE)

(73) Assignee: BASF SE, Ludwigshafen am Rhein (DE)

(*) Notice: Subject to any disclaimer, the term of this patent is extended or adjusted under 35 U.S.C. 154(b) by 391 days.

(21) Appl. No.: 16/634,627

(22) PCT Filed: Jul. 31, 2018

(86) PCT No.: PCT/EP2018/070727
§ 371 (c)(1),
(2) Date: Jan. 28, 2020

(87) PCT Pub. No.: WO2019/025439
PCT Pub. Date: Feb. 7, 2019

(65) Prior Publication Data
US 2021/0086405 A1 Mar. 25, 2021

(30) Foreign Application Priority Data

Jul. 31, 2017 (EP) .................................... 17184104
May 28, 2018 (EP) .................................... 18174485

(51) Int. Cl.
*B29B 15/12* (2006.01)
*B05C 3/12* (2006.01)
(Continued)

(52) U.S. Cl.
CPC ............ *B29B 15/125* (2013.01); *B05C 3/125* (2013.01); *B05C 11/021* (2013.01); *B05C 11/04* (2013.01);
(Continued)

(58) Field of Classification Search
CPC ..... Y10S 118/18; B05C 11/021; B05C 3/125; B29B 15/125; H01B 13/16; D06B 2700/25; D06B 3/04
See application file for complete search history.

(56) References Cited

U.S. PATENT DOCUMENTS 2,062,389 A * 12/1936 Bleibler ................... D06B 3/04
68/241
2,407,337 A * 9/1946 Kolter ...................... B05C 3/12
118/125
(Continued)

FOREIGN PATENT DOCUMENTS

CN 102660118 A 9/2012
CN 103687705 A 3/2014
(Continued)

OTHER PUBLICATIONS

Macmillan Dictionary, "Nozzle definitions and synonyms", https://www.macmillandictionary.com/us/dictionary/american/nozzle, Macmillan Education Limited 2009-2022, p. 1. (Year: 2022).*
(Continued)

*Primary Examiner* — Karl Kurple
(74) *Attorney, Agent, or Firm* — Armstrong Teasdale LLP

(57) ABSTRACT

The disclosure relates to an apparatus for impregnating fibers (1) with a matrix material, including a unit for soaking the fibers with the matrix material. A unit for setting the fiber content by volume (100) includes at least one opening (107) through which the soaked fibers (1) are guided. Each opening (107) includes a minimum opening cross section (111)
(Continued)

dimensioned such that matrix material is removed such that the desired fiber content by volume is achieved. The disclosure furthermore relates to a method for impregnating fibers in the apparatus.

7 Claims, 13 Drawing Sheets

(51) Int. Cl.

| | |
|---|---|
| *B05C 11/02* | (2006.01) |
| *B05C 11/04* | (2006.01) |
| *B05C 11/06* | (2006.01) |
| *B05D 3/00* | (2006.01) |
| *B29B 15/14* | (2006.01) |

(52) U.S. Cl.
CPC ............... *B05C 11/06* (2013.01); *B05D 3/00* (2013.01); *B29B 15/12* (2013.01); *B29B 15/122* (2013.01); *B29B 15/14* (2013.01); *Y10S 118/18* (2013.01)

(56) References Cited

U.S. PATENT DOCUMENTS

| | | | | |
|---|---|---|---|---|
| 2,433,965 | A | | 1/1948 | Upson |
| 3,033,729 | A * | 5/1962 | Shobert .................... B29C 70/52 |
| | | | | 273/DIG. 7 |
| 3,231,414 | A | | 1/1966 | Horton et al. |
| 3,450,571 | A * | 6/1969 | Zenczak ............. H01M 50/414 |
| | | | | 427/195 |
| 3,770,539 | A * | 11/1973 | Bullock .................. B29C 70/08 |
| | | | | 156/308.6 |
| 3,878,813 | A | | 4/1975 | Roberson et al. |
| 3,890,925 | A * | 6/1975 | Roberson .............. B29C 70/504 |
| | | | | 118/104 |
| 4,183,319 | A * | 1/1980 | Sakurai ................ B29D 23/001 |
| | | | | 118/44 |
| 4,243,445 | A * | 1/1981 | Seguin ................... H01B 13/16 |
| | | | | 264/171.16 |
| 4,267,007 | A | | 5/1981 | Kellogg |
| RE30,770 | E * | 10/1981 | Shobert .............. B29C 35/0288 |
| | | | | 264/258 |
| 4,325,750 | A * | 4/1982 | Takaoka ................ H01B 7/303 |
| | | | | 118/420 |
| 4,631,101 | A * | 12/1986 | Rix ....................... B29C 53/602 |
| | | | | 156/175 |
| 4,643,126 | A * | 2/1987 | Wilkinson ............ B29B 15/125 |
| | | | | 118/405 |
| 4,919,739 | A * | 4/1990 | Dyksterhouse .......... C08J 5/243 |
| | | | | 427/195 |
| 4,937,028 | A | | 6/1990 | Glemet et al. |
| 4,994,303 | A * | 2/1991 | Calkins ............... D06M 15/256 |
| | | | | 427/175 |
| 5,084,305 | A | | 1/1992 | Marttila |
| 5,104,698 | A * | 4/1992 | Hayashi ................. D21H 23/42 |
| | | | | 427/365 |
| 5,116,450 | A * | 5/1992 | Spoo ..................... B29C 33/306 |
| | | | | 425/185 |
| 5,128,198 | A * | 7/1992 | Dyksterhouse ......... B29C 70/54 |
| | | | | 428/338 |
| 5,658,513 | A * | 8/1997 | Amaike .................. B29C 70/50 |
| | | | | 264/171.23 |

| | | | | |
|---|---|---|---|---|
| 5,747,075 | A | | 5/1998 | Gauchel et al. |
| 5,766,357 | A | | 6/1998 | Packer et al. |
| 6,251,206 | B1 * | 6/2001 | Saito ..................... B29B 15/122 |
| | | | | 425/114 |
| 6,372,294 | B1 * | 4/2002 | Vodermayer ............ B29B 15/12 |
| | | | | 427/434.2 |
| 6,610,146 | B1 * | 8/2003 | Peng ....................... C03C 25/18 |
| | | | | 118/125 |
| 6,797,100 | B1 * | 9/2004 | Gord ..................... B29C 48/919 |
| | | | | 156/156 |
| 6,849,331 | B1 * | 2/2005 | Flautt .......................... C08J 5/06 |
| | | | | 428/378 |
| 7,413,623 | B2 | | 8/2008 | Raday |
| 9,321,073 | B2 * | 4/2016 | Regan .................. B29C 70/523 |
| 9,685,257 | B2 * | 6/2017 | Daniel ...................... H01B 7/18 |
| 2003/0157280 | A1 * | 8/2003 | Boissonnat ............ B29C 48/15 |
| | | | | 425/114 |
| 2003/0176561 | A1 | | 9/2003 | Joshi et al. |
| 2004/0033355 | A1 * | 2/2004 | Beckman .............. C03C 25/323 |
| | | | | 428/375 |
| 2004/0119188 | A1 | | 6/2004 | Lowe |
| 2006/0087059 | A1 * | 4/2006 | Boissonnat ............ B29C 48/15 |
| | | | | 264/555 |
| 2007/0113983 | A1 * | 5/2007 | Brown .............. C08G 18/7657 |
| | | | | 156/441 |
| 2010/0068518 | A1 | | 3/2010 | Honma et al. |
| 2012/0222809 | A1 | | 9/2012 | Scherzer et al. |
| 2014/0061974 | A1 * | 3/2014 | Tyler ..................... B29C 64/106 |
| | | | | 264/401 |
| 2014/0191437 | A1 | | 7/2014 | Johnson et al. |
| 2014/0212650 | A1 * | 7/2014 | Johnson ............... B29B 15/122 |
| | | | | 428/300.1 |
| 2016/0151937 | A1 * | 6/2016 | Eastep .................... B29C 48/05 |
| | | | | 427/513 |
| 2016/0346966 | A1 * | 12/2016 | Gaillard .................. B29C 43/52 |
| 2016/0347009 | A1 | | 12/2016 | Gaillard et al. |
| 2018/0126642 | A1 * | 5/2018 | Tyler .................... B29C 70/384 |
| 2023/0256688 | A1 * | 8/2023 | Meyer .................. B29C 70/382 |
| | | | | 264/257 |

FOREIGN PATENT DOCUMENTS

| | | | |
|---|---|---|---|
| CN | 105729833 | A | 7/2016 |
| CN | 106163776 | A | 11/2016 |
| EP | 0415517 | A1 | 3/1991 |
| JP | S45029112 | A | 9/1970 |
| JP | S61132671 | A | 6/1986 |
| JP | H01316222 | A | 12/1989 |
| JP | 2004506800 | A | 3/2004 |
| RU | 112664 | U1 | 1/2012 |
| RU | 167566 | U1 | 1/2017 |
| WO | 0196077 | A1 | 12/2001 |
| WO | 2007062516 | A1 | 6/2007 |
| WO | 2013128841 | A1 | 9/2013 |
| WO | 2017053251 | A1 | 3/2017 |

OTHER PUBLICATIONS

English translation of International Search Report for International Application No. PCT/EP2018/070727, mailed Oct. 17, 2018, 2 pages.
A. Miaris et al.: "Modeling the Impregnation Process of a Siphon Impregnation System during Filament Winding", Proceedings of the ASME 2011 Pressure Vessels and Piping Division Conference, PVP2011, Jul. 2011 (Jul. 1, 2011). 9 pages.

* cited by examiner

DEVICE FOR IMPREGNATING FIBERS WITH A DEFINED FIBER VOLUME CONTENT

CROSS-REFERENCE TO RELATED APPLICATIONS

This application is a U.S. National Phase Application of PCT/EP2018/070727, filed Jul. 31, 2018, which claims the benefit of priority to EP application Ser. No. 17/184,104.2, filed Jul. 31, 2017, and EP application Ser. No. 18/174, 485.5, filed May 28, 2018, the contents of which are hereby expressly incorporated by reference in their entirety.

The invention proceeds from an apparatus for impregnating fibers with a matrix material, comprising a unit for soaking the fibers with the matrix material.

Fiber-composite materials are produced by impregnating fibers. Fibers that have been impregnated in a bath can be used in order for components, for example pipes, masts, or tanks, to be produced by the wet-wrapping method. Such an apparatus permits continuous impregnation of the fibers which can then be further processed directly after soaking. The soaked fibers in the wet-wrapping methods are usually wound to form the final product prior to the matrix material having cured or solidified. Curing or solidifying of the matrix material so as to form the final product is then performed post-wrapping.

Various methods are known for soaking fibers, wherein a bath through which the fibers are guided is typically employed.

For example, it is thus known from U.S. Pat. No. 2,433, 965 for endless fibers to be directed through a bath in that the fibers are immersed into the bath from above and are guided about rollers within the bath. Upon leaving the bath, the fibers thus soaked are guided through a pair of rollers in which excess matrix material is squeezed out. To this end, the roller pairs are located above the bath surface, so that the separated matrix material can flow back into the bath.

An apparatus for producing a wrapped product is known from U.S. Pat. No. 4,267,007. The fibers prior to the wrapping process herein are likewise soaked in a bath having the matrix material. To this end, the fibers are guided about a roller within the bath. The soaked fibers thereafter are directed across a plate and are pushed onto the plate by a block in order for excess matrix material to be squeezed out.

However, all methods in which the fibrous structure is directed through a bath have the disadvantage that the viscosity of the matrix material by virtue of the usually open bath changes over time, either by virtue of evaporation or, depending on the matrix material used, also by a chemical reaction by virtue of contact with humidity in the air. Moreover, it is necessary for the fibers to be laboriously threaded again after each start-up, for example after a cleaning operation. Filling of the bath can only be performed once the fibers have already been placed therein.

In order to avoid in particular that the viscosity of the matrix material changes, methods and apparatuses in which the fibers are guided through a gap in which the impregnation is performed are known. Such an apparatus is known, for example, from U.S. Pat. Nos. 4,937,028, 5,766,357, or from WO-A 2007/062516, as well as from A. Miaris et al., "Modeling the Impregnation Process of a Siphon Impregnation System during Filament Winding", Proceedings of the ASME 2011 Pressure Vessels and Piping Division Conference, PVP2011, July 2011. However, these methods in particular have the disadvantage that the matrix material by virtue of the minor size of the impregnation apparatus has be fed continuously and in a very precise manner in order for a uniform impregnation to be obtained.

A pultrusion method in which the fibers are guided through ducts into which a matrix material for soaking is pumped by way of a manifold is known from U.S. Pat. No. 5,747,075.

U.S. Pat. No. 5,084,305 describes a soaking method in which the fibers are guided across webs, nozzles by way of which the matrix material is applied to the fibers being configured in each of said webs. In that the fibers are guided once along the top of a web and once along the bottom of a web, uniform impregnation is achieved in this system.

A continuous and in particular uniform infeed of the matrix material is also required in the case of this method in order for uniformly impregnated fibers to be obtained.

A further possibility for impregnating fibers is known from U.S. Pat. No. 7,413,623. The fibers here are guided about a plurality of rollers, and adding the matrix material is performed from a storage container which is disposed above the rollers and from which the matrix material is fed to a roller gap through which the fibers move from the top down. It is in particular disadvantageous herein that excess matrix material runs off down through the rollers and cannot be recycled. There is additionally the risk of matrix material being deposited on the rollers and curing on the roller surface, leading to necessary additional and complex cleaning processes.

A further disadvantage in the case of all known methods is that it is not possible for a specific fiber content by volume which also remains consistent during the soaking of the fibers to be set.

It has therefore been an object of the present invention to provide an apparatus and a method for impregnating fibers by way of which a predefined fiber content by volume can be set and in which the fiber content by volume during the impregnation does not vary even by virtue of variations in the operating parameters during production.

The object is achieved by an apparatus for impregnating fibers with a matrix material, comprising a unit for soaking the fibers with the matrix material, wherein a unit for setting the fiber content by volume which comprises at least one opening by way of which the soaked fibers are guided is included, wherein each opening at the minimum opening cross section thereof is dimensioned such that so much matrix material is removed that the desired fiber content by volume is achieved.

Fibers which can be impregnated by the apparatus can be available in the form of rovings, threads, or yarns, for example, preferably in the form of rovings. Alternatively, the fibers can also be available in the form of planar fibrous structures, for example as mats, woven fabrics, knitted fabrics, warp/weft-knitted fabrics, or non-woven fabrics.

The unit for soaking the fibers comprises, for example, a bath for receiving the matrix material. Alternatively, however, any other unit for soaking fibers that is known to a person skilled in the art, for example a roller impregnation unit, or a unit in which the matrix material is poured onto the fibers, can also be used. Furthermore, it is also possible for a mixing head, preferably a low-pressure mixing head, to be provided as a unit for soaking the fibers. The fibers herein are impregnated in a chamber below the mixing head.

Upon impregnation, the fibers are guided through the opening in the unit for setting the fiber content by volume. When a large quantity of matrix material has been absorbed by the fibers, there is also the possibility for matrix material to be wiped from the fibers before the fibers are guided through the opening in the unit for setting the fiber content by volume. To this end, wipers having a wiping edge by way of which the fibers are guided can be used for example. It is preferable in particular when soaking by way of a mixing head for the fibers to be guided through the unit for setting the fiber content by volume directly after soaking.

The object is furthermore achieved by a method for setting the fiber content by volume when impregnating fibers in such an apparatus, said method comprising the following steps:
(a) soaking the fibers with a matrix material;
(b) guiding the soaked fibers through the at least one opening of the installation for setting the fiber content by volume, wherein at least two fibers are guided through each opening of the unit for setting the fiber content by volume, and each opening has a minimum cross-sectional area which meets the following correlation:

$$A = \frac{n \cdot Tex}{\varphi \cdot \rho}$$

where
    n=number of fibers which in the operation are guided through the opening;
    Tex=the fiber count Tex in g/1000 m;
    φ=fiber content by volume;
    ρ=density of the fibers.
    It applies to the fiber content by volume φ that $$\varphi = \frac{V_{Fiber}}{V_{Fiber} + V_{Matrix}}$$

with the fiber volume $V_{Fiber}$ and the matrix volume $V_{Matrix}$.

When no individual fibers but rovings or planar fibrous structures are to be soaked with the matrix material, it is preferable for the number and the Tex count of the rovings or of the planar fibrous structures, respectively, which are guided through an opening to be inserted instead of the number and the Tex count of the fibers.

By guiding the fibers through at least one opening which at the minimum opening cross section thereof is dimensioned such that so much matrix material is removed that the desired fiber content by volume is achieved, so much matrix material is removed from the soaked fibers that the fiber content by volume downstream of the opening is always the same. Other than is the case with wipers on which matrix material is removed on the wiping edge thereof, a consistent fiber content by volume is always achieved even in the case of variations in the process parameters, for example in the case of a higher matrix material content in some locations, since the soaked fibers when running through the opening are enclosed on all sides and thus no drops which in locations can reduce the fiber content by volume can get caught on the fibers.

A further advantage of the apparatus according to the invention and of the method according to the invention is that different fiber contents by volume can be set so as to depend on the application, in that the opening cross section of the opening in the unit for setting the fiber content by volume is varied. To this end, either the opening in the unit for setting the fiber content by volume can be adjustable, or alternatively a plurality of replaceable units for setting the fiber content by volume, having different opening cross sections, are kept ready, wherein the unit having the matching opening cross section is selected and inserted for setting the desired opening cross section. However, it is preferable for the opening in the unit for setting the fiber content by volume to be adjustable.

The shape of the opening depends on the fibers to be soaked. For example, it is thus preferable in the case of fibers in the form of individual threads, yarns, or rovings, for an opening having a round cross-sectional area to be provided, whereas a slot-shaped opening is preferable in the case of mats, woven fabrics, knitted fabrics, warp/weft-woven fabrics, or non-woven fabrics, the height of said slot-shaped opening corresponding to at least the thickness of the planar fibrous structure and in terms of height preferably being double the thickness of the fibrous structure.

In one embodiment, the cross-sectional area of the at least one opening in the unit for setting the fiber content by volume decreases in size in the running direction of the fibers in the operation. The cross-sectional area preferably decreases steadily in the running direction, and the reduction in the cross-sectional area in the running direction of the fibers is particularly preferably conical. A more uniform compression of the soaked fibers can be achieved by the reduction in the cross-sectional area in the running direction of the fibers, on the one hand, on account of which uniform guiding of the fibers through the openings in the unit for setting the fiber content by volume is enabled even when the fiber content by volume is not consistent upstream of the unit for setting the fiber content by volume. A further advantage in a design of the openings in the unit for setting the fiber content by volume, having a decreasing cross-sectional area in the running direction of the fibers in the operation is that matrix material that is wiped and/or squeezed from the fiber can flow more easily out of the opening, thus not impeding the procedure of setting the fiber content by volume. The wiped and/or squeezed matrix material is preferably collected and guided back into the unit for soaking the fibers.

When the fibers are available as rovings, it is advantageous in order for a defined fiber content by volume to be set when the fibers of the roving to be impregnated do not have to be singularized but for the rovings to remain in the form of a bundle. To this end, it is preferable for each opening in the unit for setting the fiber content by volume to have a maximum width and a maximum height, each corresponding to at least the diameter of a roving. When a plurality of rovings are to be guided through one opening, and the maximum height of the opening corresponds to the diameter of one roving, the width of the opening must correspond to at least the number of rovings multiplied by the diameter of the latter, since all the rovings in this case are guided through the opening so as to be beside one another. When the opening that is thus designed as an elongate bore is disposed so as to be rotated by 90°, the maximum width corresponds to the diameter of one roving, and the height corresponds to the product of the number of rovings multiplied by the diameter of one roving. However, it is preferable for the opening to be designed such that the rovings can be guided through the opening in the form of a bundle. It is particularly preferable herein for the opening to be designed so as to be circular. However, any other shape of the opening, for example in the shape of an oval or of a polygon having at least three corners, is also possible. However, it is preferable for the opening to have a shape without corners, that is to say to be circular or oval. However, a design of the opening in a manner that the height or the width corresponds to the diameter of one roving is only possible for applications in which individual rovings are to be soaked sequentially. As soon as it is necessary for endless fibers to be used, for example for the production of wrapped hollow elements, said endless fibers being generated in that rovings are interconnected by knots, for example, a minimum height or width which is double the diameter of one roving is required.

When the fibers to be soaked are available as rovings, the cross-sectional area of the opening is preferably chosen so large that at least two rovings, preferably at least four rovings, and in particular seven rovings, can be guided through said opening. The maximum number of rovings is also derived from the unit for soaking the fibers, in which the rovings have previously been soaked. Since the rovings are to be soaked individually and then are assembled for guiding through the opening in the unit for setting the fiber content by volume, a very large number of rovings in the case of an apparatus having a bath for soaking the rovings leads to a very wide bath. Moreover, a certain distance is also required for assembling the rovings, such that the maximum number of rovings in general is not more than 50. In order for the distance for assembling the rovings to be shortened, it is also possible for a plurality of openings in the unit for setting the fiber content by volume to be provided in the case of a very large number of rovings, part of the soaked rovings being guided through each of said openings. The cross-sectional area of the opening is preferably so large that the latter corresponds to at least the cross-sectional area of n+1 rovings, wherein n is the number of rovings which are guided through the opening. The rovings, on account of a plurality of rovings being guided through the opening in the unit for setting the fiber content by volume, are wrung in a self-acting manner according to the cross-sectional area, thus achieving the desired fiber content by volume.

In order for the apparatus to be able to be used for different numbers of fibers, or for varying the fiber content by volume, it is possible for a plurality of units for setting the fiber content by volume to be provided, wherein each of the units for setting the fiber content by volume has another cross-sectional area. However, it is preferable for each opening in the unit for setting the fiber content by volume to be adjustable. This permits the same unit for setting the fiber content by volume to be used for different fiber contents by volume, or alternatively for different numbers of fibers.

Independently of whether the unit for setting the fiber content by volume is adjustable or not, the unit for setting the fiber content by volume comprises an upper part and a lower part, and the opening is configured in each case partially in the upper part and partially in the lower part. This has the advantage that the fibers can be placed into the unit for setting the fiber content by volume in a simple manner. The fibers can thus be placed into the part of the opening in the lower part, and the upper part can subsequently be placed thereonto. To facilitate inserting the fibers, it is particularly advantageous, when the part of the opening in the lower part is bigger than the part of the opening in the upper part. Particularly preferably the part of the opening in the lower part has such a size that the fibers can be inserted completely into the part of the opening in the lower part to avoid that fibers slip out of the opening while the upper part is put on the lower part and are jammed between the lower part and the upper part. Herein it is particularly advantageous when the part of the opening in the lower part is 75 to 100% of the whole opening cross section. A ratio of 100% of the whole opening cross section is particularly possible, when the part of the opening in the lower part is closed planarly with the upper part.

However, it is preferable for the unit for setting the fiber content by volume to comprise an upper part and a lower part, each having one clearance, wherein in the case of the unit for setting the fiber content by volume being fitted, the clearance in the lower part and the clearance in the upper part intersect one another, thus forming the opening, and for the opening cross section to be adjustable by the mutual relative position of the upper part and the lower part. This can be implemented, for example, in that the upper part and the lower part intersect one another to a variable degree, wherein it is possible herein for the upper part and the lower part to be displaced both horizontally as well as vertically in relation to one another. It is preferable herein for the upper part or the lower part to be fixedly fitted, and the lower part, in the case of a fixedly fitted upper part, or the upper part, in the case of a fixedly fitted lower part, to be displaceably fitted, respectively.

In one particularly preferred embodiment the unit for setting the fiber content by volume is designed and positioned such that said unit for setting the fiber content by volume by way of that side on which the fibers are fed is submerged in the bath and that side on which the fibers exit from the unit for setting the fiber volume lies outside the bath. This positioning of the unit for setting the fiber volume has the advantage that no air or no gas is introduced into the matrix material in the bath by way of the wiped and returning matrix material, on account of which aging of the matrix material is further delayed and it is moreover also prevented that a complete soaking of the fibers is compromised by air bubbles incorporated in the matrix material. The introduction of air or gas is prevented in that the unit for setting the fiber content by volume in this case is completely filled with the fibers and the matrix material and does not contain any air or any gas, respectively. When that side of the unit for setting the fiber content by volume on which the soaked fibers are fed is located outside the bath of matrix material, matrix material flowing back initially drips through the air or the gas above the bath and can in this way entrain air or gas which will thus be introduced into the bath. On account of the movement of the matrix material in the bath, said movement resulting both by wiped matrix material flowing back or dripping into said bath and by movement of the fibers, the entrained gas is split into fine bubbles and is distributed in the matrix material.

It is particularly advantageous for a unit for setting the fiber content by volume, which by way of one side protrudes into the bath of matrix material and by way of the other side lies outside the bath, to be designed such that the unit for setting the fiber content by volume has a nozzle having the minimal cross section, said nozzle protruding into the matrix material, and a duct, for example in the form of a sleeve, which adjoins the nozzle and through which the soaked fibers are guided and which terminates outside the matrix material. The cross-sectional face of the duct herein is chosen so as to be so large that the soaked fibers do not contact the wall of the duct. In order for the excess matrix material to be wiped on the minimal cross-sectional face it is furthermore preferable for an encircling wiping edge to be provided on the duct at the position of the minimal cross-sectional face. The cross section of the duct herein can assume any arbitrary shape, wherein a cross-sectional shape without corners, for example a round cross section or an oval cross section, is preferable. The nozzle in one embodiment is embodied such that said nozzle has a variable cross section so as to be able to set the fiber content by volume. Alternatively, it is also possible for a replaceable nozzle to be provided for setting the fiber content by volume.

It is preferable for the unit for setting the fiber content by volume, which has a nozzle and a duct, to be designed in two parts, wherein said unit for setting the fiber content by volume has a lower part and a lid such that the fibers can be placed into the lower part in a simple manner and the unit for setting the fiber content by volume is subsequently closed by the cover.

Alternatively, it is also possible for the unit for setting the fiber content by volume to be embodied in a wall of the bath. In this case, the unit for setting the fiber content by volume is embodied as an opening in the wall, wherein said opening on the external side has the minimal cross-sectional face. The cross-sectional face is larger on the internal side, that is to say on that side that faces the bath, such that the fibers can more easily be threaded through the opening. When the unit for setting the content by volume is embodied in the wall of the bath, it is furthermore preferable for the fibers to be placed first and for the matrix material to be subsequently filled. Sealing is simultaneously performed by the fibers that are guided through the opening that forms the unit for setting the fiber content by volume, on account of which sealing it is prevented that the matrix material runs out of the bath.

The infeed of the fibers can also be configured in the wall of the bath. This is possible independently of the type of the unit for setting the fiber content by volume. When the infeed of the fibers into the bath is configured as an opening in the wall, the cross-sectional face at the tightest cross section preferably corresponds to the cross-sectional face that is assumed by the fibers to be fed. It is also advantageous here for the cross-sectional face of the opening on that side through which the fibers enter the bath to be larger in order for the threading of the fibers to be facilitated. It is prevented in operation, on account of the minimal cross-sectional face which corresponds to the cross-sectional face of the fibers that are guided through the opening, that matrix material runs through the opening out of the bath. The fibers that are guided through the opening herein act as a seal.

It is particularly preferable for the device for impregnating fibers, in which the fibers are fed through an opening in the wall of the bath and the unit for setting the fiber content by volume is likewise embodied in the wall of the bath, to be closed by way of a lid. It is possible, in particular when the device that is closed by way of the lid is completely filled with matrix material, for the device for impregnating fibers to be positioned at an arbitrary angle. In this way, impregnated fibers from the device for impregnating fibers can be fed to a winding core from different positions without the fibers upon leaving the unit for setting the fiber content by volume having to be deflected once again. In particular, a star-shaped infeed of the fibers to the winding core is possible by way of such a device, wherein the devices for impregnating the fibers are likewise disposed in a star-shaped manner.

It is furthermore preferable for a connector through which the matrix material can be resupplied to be provided if the device for impregnating fibers, in which the fibers are fed through an opening in the wall of the bath and are drawn off by a unit for setting the fiber content by volume, the latter being configured in the wall of the bath. Filling with the matrix material can in this instance first be performed by way of the connector once the fibers have been placed, and matrix material can subsequently be resupplied in the ongoing operation such that it is not necessary for the winding process to be interrupted in order for consumed matrix material to be topped up.

When fiber bundles or rovings are fed, the cross-sectional face of the opening for infeeding the fibers, like the opening which forms the unit for setting the fiber content by volume, preferably has no corners. Suitable cross-sectional shapes are, for example, a circular or oval shape. When the fibers to be soaked are present as flat fibers, for example in the form of narrow tapes, the cross-sectional shape of the openings for infeeding the fibers, to the extent that said openings is present, and the cross-sectional shape of the opening that forms the unit for setting the fiber content by volume are preferably rectangular, wherein the corners of the rectangular that forms the opening can be rounded also in this case.

In the case of infeeding fiber bundles or bundles from a plurality of rovings it is furthermore preferable for the fiber bundles or bundles from a plurality of rovings to be split after infeeding. A splitting of a fiber bundle into individual fibers or else into units having a lower number of fibers can be performed herein when fiber bundles are fed. In the case of bundles from a plurality of rovings being fed, splitting into individual rovings is preferably performed. To this end, for example, deflection units are provided in the bath of matrix material, the individual fibers, units having a lower number of fibers, or individual rovings being guided about said deflection units. The soaking of the fibers with the matrix material is improved by said splitting since the matrix material by virtue of the smaller cross section does not have to penetrate the fibers that deeply in order for complete soaking of the fibers to the achieved.

When the unit for soaking the fibers comprises a bath having the matrix material, it is preferable for the apparatus to comprise a lower part in which the bath is received, and a lid for closing, wherein in the case of the lid being fitted, in each case one gap is configured between the lid and the lower part on those sides through which the fibers are guided into the apparatus and exit from the apparatus. In the case of such a design having a lower part and a lid it is furthermore preferable for the upper part of the unit for setting the fiber content by volume to be disposed on the lid, and for the lower part of the unit for setting the fiber content by volume to be disposed on the lower part.

In order for the matrix material that drips from the fibers not to have to be disposed of but to be able to be recycled, the lower part has a face that is inclined in the direction of the bath, matrix material dripping from the fibers being able to run back into the bath by way of said inclined face.

On account of the bath having the matrix material through which the fibers are guided for soaking, it is not necessary for metering units by way of which a precise quantity of matrix material is fed to be provided. The fibers absorb the matrix material when running through the bath.

In particular when a large quantity of matrix material is absorbed, it is advantageous for excess matrix material to be wiped prior to guiding the fibers through the unit for setting the fiber content by volume. To this end, at least one wiper having a wiping edge by way of which the fibers are guided in the operation can be used. The wiped matrix material drips onto the face that is inclined in the direction of the bath such that the excess wiped matrix material runs by way of the inclined face back into the bath and can thus be recycled.

On account of the lid by way of which the apparatus is closed it is prevented that a permanent exchange of air is performed above the bath. On account thereof, the evaporation of the matrix material can be restricted, on the one hand; the permanent infeed of fresh air is also precluded on the other hand, such that a reaction of the matrix material with the water that is contained in the air is decelerated. The matrix material that is contained in the bath can thus be utilized for a longer period and needs to be replaced less frequently because of aging and an associated increase in viscosity. In order to prevent fibers being damaged when entering the apparatus or when leaving the apparatus, and in order to furthermore prevent the matrix material being squeezed from the fibers again upon leaving the apparatus, one gap through which the fibers are guided into the apparatus and a second gap through which the soaked fibers leave the apparatus again are provided between the lid and the lower part.

A deflection unit by way of which the fibers in the case of the lid being fitted can be pushed into the bath is preferably fitted to the lid. On account thereof, it is possible for the bath to be filled independently of the placing of the fibers. The fibers can be placed in a simple manner above the surface of the bath and are then, as the lid is being fitted, pushed into the bath by the deflection part. Any laborious placing in the case of an emptied bath can thus be dispensed with.

On account of the construction having the deflection unit on the lid, the lower part can be removed in a simple manner for cleaning and be replaced by a new lower part. On account thereof, no long operational stoppages are required in the case of cleaning. Should the cleaning effort be too great or be possible only by way of environmentally damaging means such that a disposal can be carried out in a more cost-effective and more environmentally friendly manner, the apparatus according to the invention also permits lower parts to be embodied as single-use parts and a lower part to the replaced by a new one on demand.

In order for the fibers to be uniformly wiped upon running through the bath, in addition to the at least one wiper by way of which the soaked fibers are guided in the operation, it is preferable for at least one wiper to be fitted to the lid, said wiper in the case of a lid being fitted by way of a wiping edge pushing from above onto the soaked fibers. The excess matrix material is also wiped from the upper side of the fibers by the at least one wiper fitted to the lid. Said excess matrix material also drips onto the face that is inclined in the direction of the bath, the matrix material flowing from said inclined face back into the bath. On account of the wiper being fitted to the lid, it is possible also herein for the fibers to be placed into the apparatus in a simple manner by way of the parts fitted to the lower part. Once the lid has been fitted, the parts acting from above in a corresponding manner then push down on the fibers. A complex threading between the individual wipers and deflection parts is not required.

In order for the pressure acting on the fibers to be able to be set, it is furthermore preferable for at least one wiper fitted to the lid to be adjustable for height. It is particularly preferable for all wipers fitted to the lid to be adjustable for height. When a plurality of wipers which are fitted to the lid are provided, it is possible for each wiper to be set individually. This enables guiding by the wipers fitted to the lower part and to the lid in such a manner that a desired quantity of matrix material remains in the fibers. The larger the spacing between the wiping edge of the wiper fitted to the lid and the lid, the greater the pressure which acts on the soaked fibers, and the larger the quantity of wiped matrix material. When thus fibers having a lot of matrix material are to be obtained, the wipers are set such that only a minor pressure acts on the fibrous structure; when instead only a minor proportion of matrix material is to be contained in the fibers, the wipers are set such that a higher pressure acts on the fibrous structure.

In order for the matrix material to be wiped uniformly from the fibers, it is furthermore preferable for the wipers in the conveying direction of the fibers to be disposed in a mutually offset manner on the lid and on the lower part. It is particularly preferable herein for one wiper in the conveying direction of the fibers to be disposed alternatingly on the lid and on the lower part, respectively. On account of such an arrangement the fibers are guided uniformly along the wipers from the top down, the matrix material being wiped. An alternating arrangement of the wipers on the lower part and on the lid furthermore leads to the wipers that are fitted to the lid in each case meshing with the wipers that are fitted to the lower part. This has the further positive effect that in a height setting of the wipers on the lid of the fibers the same pressure acts on the fibers which pass the wiping edge of that wiper that is fitted to the lid as is the case on the neighboring wiping edge of that wiper that is fitted to the lower part. On account thereof, a uniform impregnation of the fibers is obtained.

In order for the excess matrix material to be wiped from the fibers it is particularly advantageous for the wipers on the lower part and on the lid to in each case be dimensioned such that the wiping edge of the wipers on the lid sits lower than the wiping edge in the lower part of the apparatus. In this manner, there is always meshing between the wipers fitted to the lid and the wipers fitted to the lower part. The intensity of the mutual meshing of the wipers can then be set by way of a height adjustment of the wipers fitted to the lower part and/or of the wipers fitted to the lid.

The subsequent precise setting of the proportion of matrix material in the fibers is performed once the latter have passed the wipers in the unit for setting the fiber content by volume.

Abrasion-resistant metal, abrasion-resistant plastics, abrasion-resistant ceramics, or glass are particularly suitable as material for the wipers and for the unit for setting the fiber content by volume. It is ensured by the use of an abrasion-resistant material that no particles that have been removed by the wiper or by the unit for setting the fiber proportion by volume make their way as foreign matter into the soaked fibers. It is moreover prevented on account thereof that the wiping edges, or the at least one opening in the unit for setting the fiber content by volume, respectively, is deformed by abrasion in the course of operation. On account thereof, a uniform effect of the wipers and of the unit for setting the fiber content by volume is achieved across the entire duration of operation. Steel, high-density polyethylene (HDPE), polytetrafluoroethylene (PTFE), ceramics, or glass are particularly preferable materials for the wipers and for the unit for setting the fiber content by volume.

Abrasion-resistant in the context of the present invention is understood to mean that in the processing of 1000 km of the fibers, in particular of rovings, less than 0.1 mm of the material of the wiper is removed by the passing fibers.

In order for the fibers not to be damaged and in particular not to scrape across an edge when being guided into the apparatus, it is preferable for a first deflection unit by way of which the fibers are guided prior to entering the bath to be provided on the lower part. Accordingly, a second deflection unit by way of which the soaked fibers are guided upon leaving the bath is preferably provided on the lower part. Since the first deflection unit and the second deflection unit each are provided on the lower part, the fibers when being placed can be simply placed onto the deflection units. The fibers by way of the deflection unit that is fastened to the lid are then pushed into the bath such that the fibers are guided across the first deflection unit on the lower part, along the deflection unit on the lid, and across the second deflection unit on the lower part toward the drip unit. The first deflection unit and the second deflection unit on the lower part herein are placed such that the deflection unit on the lid, when being fitted, is positioned between the first deflection unit on the lower part and the second deflection unit on the lid.

In order for excess matrix material to be removed from the fibers already when the latter leave the bath and ahead of the drip unit, it is furthermore preferable for a squeegee roller which in the case of the fitted lid pushes the fibers onto the second deflection unit to be fitted to the lid. In operation, the fibers are guided through between the second deflection unit and the squeegee roller. Since the squeegee roller pushes down on the deflection unit, excess matrix material is squeezed from the fibers already at this location. The positioning of the second deflection unit and of the squeegee roller furthermore leads to the excess material running directly back into the bath.

The first and the second deflection unit in a mutually independent manner can in each case be a bar or a rotatable roll. Likewise, the deflection unit by way of which the fibers are pushed into the bath can comprise at least one bar or at least one rotating roll. If the deflection unit is a bar, the latter preferably has only rounded edges and particularly preferably is a round bar. Both bars as well as rotatable rolls can be provided for the deflection elements. However, it is preferable for at least the first and the second deflection unit, which are disposed on the lower part, to either both be configured as a bar or to both be configured as a rotating roll. Particularly preferably, all deflection elements are configured as a bar, or all deflection elements are configured as a rotatable roll.

The same materials that are suitable for the wipers and for the unit for setting the fiber content by volume are suitable for the deflection elements. This means that the deflection elements are preferably made from abrasion-resistant metal, abrasion-resistant plastics, abrasion-resistant ceramics, or from glass, and particularly preferably from steel, HDPE, PTFE, ceramics, or glass.

Only one deflection element can be provided on the lid, or a plurality of deflection elements can be provided on the lid, in order for the fibers to be pushed into the bath. All deflection elements that are fitted to the lid herein are positioned such that the former are positioned between the first and the second deflection element on the lower part when the lid is closed, and when the deflection elements are present on the lower part.

In order to prevent that a permanent exchange of air takes places through the gaps through which the fibers are guided in the operation, and thus that water is permanently fed in conjointly with the humidity in the air, or that matrix material evaporates and is extracted from the apparatus, it is preferable for a lip seal to be provided on the gap through which the fibrous structure is guided into the apparatus, and/or on the gap through which the fibers exit the apparatus. The lip seal herein can be made from any suitable material, in particular from an elastomer material such as is usually employed in seals. The use of the elastomer material ensures that both the not yet impregnated fibers when entering the apparatus, as well as the impregnated fibers when leaving the apparatus, are not damaged by the lip seal. Furthermore, in the setting of the lip seal through which the soaked fibers exit, it should be ensured that no matrix material is squeezed from the soaked fibers any longer, in order for the fiber content by volume not to be changed.

In order to prevent matrix material from being able to react with components from the ambient air, in particular with water that is contained in the air and to cure herein, it is furthermore preferable for an inflow and an outflow for a flushing gas to be included. The atmosphere above the matrix material can be removed by the flushing gas and be replaced by the flushing gas. Suitable flushing gases depend on the matrix material employed. A water-free flushing gas is used in the case of matrix materials that react with water, for example. To this end, dry air or else a dry inert gas such as nitrogen, carbon dioxide, or a rare gas, are suitable, for example. Inert gases are suitable even when the matrix material can react with other components of the air, for example with the oxygen contained therein. By contrast, if it is to be prevented that matrix material evaporates, a flushing gas which is saturated with those components of the matrix material which may evaporate can be used, for example.

When the bath for soaking the fibers has a lid, and a unit for setting the fiber content by volume is provided, the latter by way of one side being submerged in the bath of matrix material and the other side of said unit lying outside the bath of matrix material, the unit for setting the fiber content by volume is preferably fastened to the lid such that the side of the unit for setting the fiber content by volume on which the fibers exit is disposed on the external side of the lid such that the fibers are guided through the lid by way of the unit for setting the fiber content by volume. An additional lip seal for sealing the interior of the bath can be dispensed with on account thereof.

The number of units used for setting the fiber content by volume, also in the case of the units for setting the fiber content by volume that by way of one side protrude into the bath and in the case of which the other side lies outside the bath, depends on the number of fibers or fiber bundles to be soaked. The number of units for setting the fiber content by volume preferably corresponds to the number as has been described above in the context of the variant in which the entire unit for setting the fiber content by volume is located outside the bath of matrix material. The diameter of the minimal cross section of the unit for setting the fiber content by volume also corresponds to that as has been described above.

In order for the soaking of the fibers to be improved and for air that is optionally contained in the fiber to be expelled, in particular when rovings or fiber bundles are to be impregnated, is it furthermore advantageous if wipers by way of which the fibers are guided are provided in the bath. The wiping edges of the wipers, in particular in operation, herein are located below the liquid level of the matrix material. The matrix material is forced into the fibers on account of the pressure that is exerted on the fibers by the wipers, and air that is optionally contained in the fibers, or gas that is optionally contained in the fibers, is squeezed out of the fibers. The wipers herein are designed, for example, as has been described above in the context of the wipers outside the bath. It is particularly advantageous herein for at least two wipers to be provided, wherein at least one wiper acts on the fiber from above, and at least one wiper acts from below. It is furthermore advantageous herein for the wipers that act on the fiber from above and below to mesh with one another such that the wiping edge of the wipers that act on the fiber from above lies below the wiping edge of the wipers that act on the fiber from below. It is also preferable here for the wipers that act on the fiber from below to be fastened in the lower part, and for the wipers that act on the fiber from above to be fastened in the lid, in order for the fibers to be able to be placed therein in a simple manner and to be pushed into the bath by way of the wipers that are fastened on the lid. When wipers are provided in the bath it is possible for said wipers to be used as an alternative to the deflection units described above, such that the deflection units can be dispensed with when the wipers are used within the bath. When no lid is provided, it is furthermore also possible for the wipers that act on the fibers from above to be fastened to the lower part that contains the bath with the aid of any other arbitrary fitting installation. To this end, the wipers that act on the fibers from above can be guided in grooves in the wall in the lower part, for example, or else be fastened to a support which is placed onto the lower part. It is also possible for the wipers to be fastened directly in the lower part. However, this is not the preferred variant since the fibers in this case have to be threaded in a complex manner, whereas in the case of a fastening to the lid or to a support, or else in the case of the wipers being guided in the groove, the fibers can be placed first, the wiper being subsequently fitted.

When the fibers to be soaked are not present in the form of rovings or fiber bundles, or else as individual fibers, but in the form of fiber tapes, for example having braided or woven fibers, the wipers are aligned such that said wipers act on the broadsides of the fiber tapes. It is also possible herein for a stack of fibers tapes to be fed, said stack within the bath then being split into individual fiber tapes. In this case, wipers which are disposed in parallel in the bath are provided for each individual fiber tape, such that each individual fiber tape is guided by way of at least two wipers which respectively act on the broad surfaces lying opposite. The wipers herein act like the deflection units that have been described above in the context of fiber bundles or bundles from a plurality of rovings. In order for any gas, in particular air, that is potentially contained in the fiber tape to be expelled, the wipers also in this case are preferably aligned such that the wiping edges engage in one another, such that the fiber tape by way of the wipers that act on one side is in each case pressed against the wipers that act on the other side of the fiber tape.

It is particularly preferable for the wipers to be used within the bath when a unit for setting the fiber content by volume is used which protrudes into the bath by way of the side by way of which the fibers are fed, the side by way of which the fibers are drawn off lying outside the bath.

In order for the fibers to be impregnated, the latter are preferably removed from a reserve, for example a roll onto which the fibers have been wrapped. In order for the apparatus for impregnating to be able to be operated in a meaningful manner, the fibers to be impregnated are bundles of endless fibers such that a finite length is derived only from the necessity that fibers of arbitrary length cannot be contained in the reserve. The fibers are preferably designed such that subsequent new fibers can be connected to the preceding fibers in a simple manner, for example by knotting, when the end of the fibers is reached.

After impregnation, the fibers in a wet-wrapping method are particularly preferably wrapped so as to form a component. Components which are thus produced are pipes, masts, or tanks of any type and size, for example.

In order for a sufficient strength of the component to be obtained, it is furthermore preferable for the fibers to be carbon fibers, glass fibers, aramid fibers, synthetic fibers, for example polymer fibers, or natural fibers. Dissimilar fibers can also be employed herein. The selection of the fibers herein is derived in particular from the mechanical requirements set for the component. However, it is common practice that no dissimilar fibers but only fibers from one material are employed. The fibers are particularly preferably carbon fibers, glass fibers, or aramid fibers.

The matrix material with which the fibers are impregnated can be any thermoplastic polymer, or contain reactants for producing a thermosetting or thermoplastic polymer, wherein the reactants must be available in a liquid or solute form. When the matrix material is a thermoplastic polymer, the latter is available as a melt, for example. Alternatively, however, it is also possible for the matrix material to contain reactants for producing the polymer in the form of a monomer solution, an oligomer solution, a monomer melt, or an oligomer melt, said reactants then reacting so as to form the desired polymer. When the fibers are to be impregnated with a thermosetting polymer, the matrix material always contains reactants for producing the desired thermosetting polymer. Additionally, the matrix material can contain usual catalysts. Reactants for producing the polymer are in general monomers or oligomers from which the polymer is constructed. When a thermosetting polymer is to be produced, the reactants can also already be available as polymers which react further so as to form thermosetting plastics.

In order for the properties of the component to be set, the matrix material can moreover contain additives. These are, for example, softeners, impact modifiers, UV stabilizers, flame-retardant agents, and any other additives known to a person skilled in the art that are usually employed for modifying polymers.

The matrix material is particularly preferably selected from unsaturated polyester resins (UP), vinyl esters (VE), epoxy resins (EP), and polyurethane (PUR) and the reactants thereof.

Exemplary embodiments of the invention are illustrated in the figures and will be explained in more detail in the description hereunder.

Figure 1A:
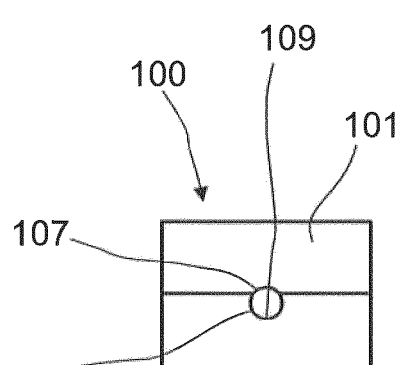
FIGS. 1a and 1b show a unit for setting the fiber content by volume in a first embodiment, in a closed and an opened position.
Figure 1B:
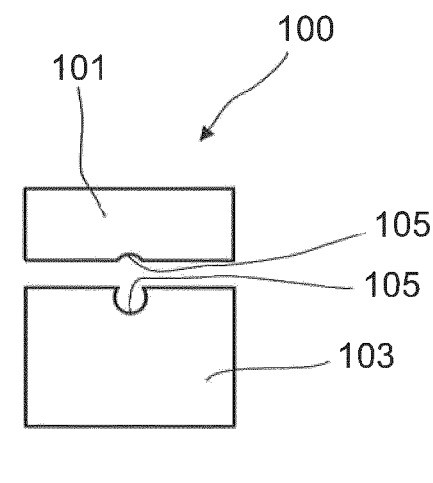

A unit for setting the fiber content by volume is illustrated in a first embodiment in FIGS. 1a and 1b.

A unit for setting the fiber content by volume 100 comprises an upper part 101 and a lower part 103. In each case one clearance 105 is located in the upper part 101 and in the lower part 103. When the upper part 101 and the lower part 103 are assembled, the clearances 105 form one opening 107. In the operation, fibers that are soaked with matrix material are guided through the opening 107, and excess matrix material is wiped on the periphery 109 of the opening.

On account of the construction of the unit for setting the fiber content by volume 100, having the upper part 101 and the lower part 103, it is possible for the unit for setting the fiber content by volume 100 to be opened, as is illustrated in FIG. 1b. This enables the fibers to be placed into the unit for setting the fiber content by volume 100 in a simpler manner.

Figure 2A:
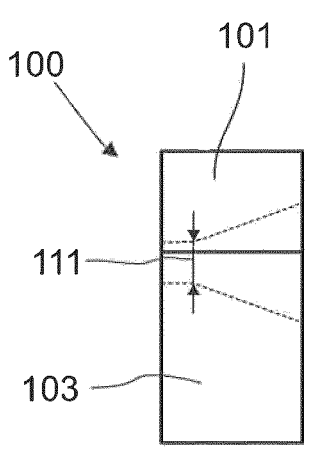
FIGS. 2a and 2b show the unit for setting the fiber content by volume of FIGS. 1a and 1b in a closed and an opened position, in a side view.
Figure 2B:
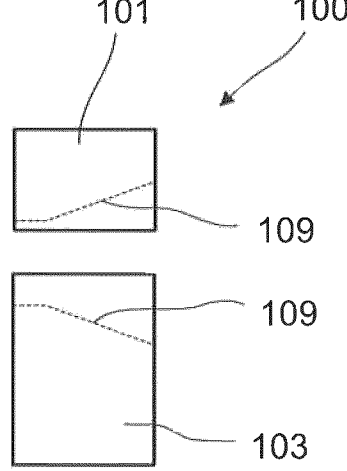

The unit for setting the fiber content by volume 100 in the embodiment of FIGS. 1a and 1 b is illustrated in a side view in FIGS. 2a and 2b. The contour of the opening 107 in the processing direction of the fibers is illustrated therein by way of a dashed line. The opening cross section, that is to say the diameter in the case of a circular opening 107 as is shown in FIGS. 1a and 1b, decreases in the processing direction of the fibers, until a minimum opening cross section 111 is reached. The minimum opening cross section herein during soaking meets the following condition:

$$A = \frac{n \cdot Tex}{\varphi \cdot \rho}$$

where n=number of fibers which in the operation are guided through the opening;

Tex=the fiber count Tex in g/1000 m;

φ=fiber content by volume;

ρ=density of the fibers.

It applies to the fiber content by volume φ that $$\varphi = \frac{V_{Fiber}}{V_{Fiber} + V_{Matrix}}$$

with the fiber volume $V_{Fiber}$ and the matrix volume $V_{Matrix}$.

When rovings or planar fibrous structures are impregnated, it is possible for the number and the Tex count of the rovings or of the planar fibrous structures, respectively, which are guided through an opening to be inserted instead of the number and the Tex count of the fibers.

As is illustrated in FIGS. 2a and 2b, the opening cross section preferably decreases in a steady manner, in particular a linear manner. In the case of a circular cross section a conical profile thus results. On account of the steady decrease in the opening cross section, the matrix material which is wiped in the region of the minimum opening cross section can run out of the unit for setting the fiber content by volume 100 in a simple manner.

Figure 3A:
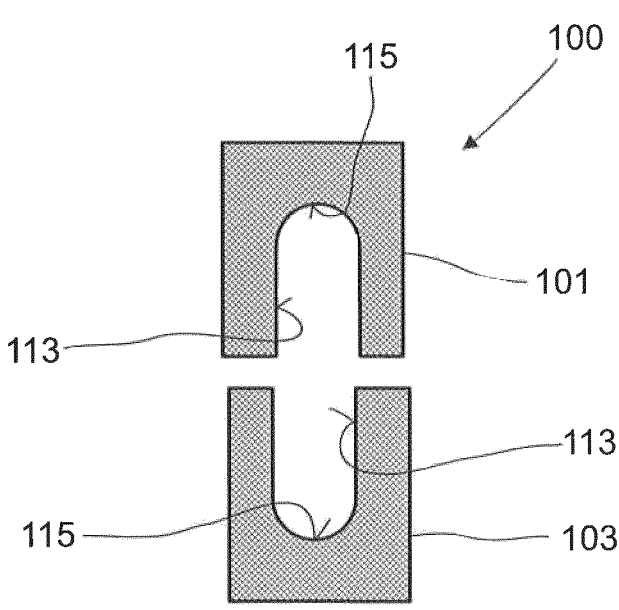
FIGS. 3a to 3c show a unit for setting the fiber content by volume in a second embodiment.
Figure 3B:
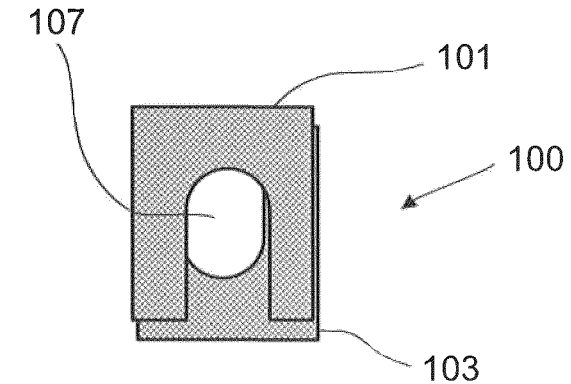
Figure 3C:
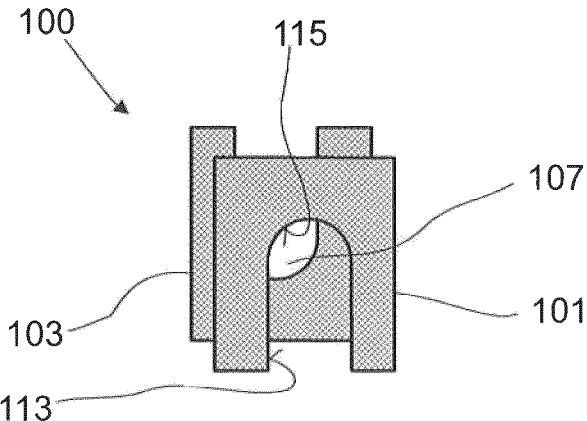

A unit for setting the fiber content by volume is illustrated in a second embodiment in FIGS. 3a to 3c.

The unit for setting the fiber content by volume 100 that is illustrated in FIGS. 3a to 3c, like the unit for setting the fiber content by volume that is illustrated in FIGS. 1a, 1b, 2a, and 2b, comprises an upper part 101 and a lower part 103. In each case one clearance 105 is configured in the upper part 101 and in the lower part 103. As opposed to the first embodiment, the clearances 105 in the upper part 101 and in the lower part 103 are U-shaped, having parallel lateral faces 113 and a semicircular base 115. As opposed to the embodiment that is illustrated in FIGS. 1a to 2b, the opening cross section of the opening 107 in the unit for setting the fiber content by volume 100 here is adjustable. To this end, the upper part 101 and the lower part 103 are not positioned so as to be directly on top of one another, but the upper part 103 in the closed state of the unit for setting the fiber content by volume 100 lies ahead of or behind the lower part. The size of the opening 107 can be set in that the region in which the upper part 101 and the lower part 103 intersect is varied. This is possible by way of a vertical displacement, on the one hand, such that the lateral faces 113 of the clearances 105 in the upper part 101 and in the lower part 103 lie on top of one another in mutual alignment, as is illustrated in FIG. 3b, or else by way of a horizontal displacement, on account of which the lateral faces 113 of the clearances 105 in the upper part 101 and in the lower part 103 are mutually offset, as is illustrated in FIG. 3c. An infinitely variable setting is possible on account thereof. Moreover, apart from the height of the opening 107, the width can also be varied such that fibers in all arrangements possible can be guided through the opening 107.

Figure 4A:
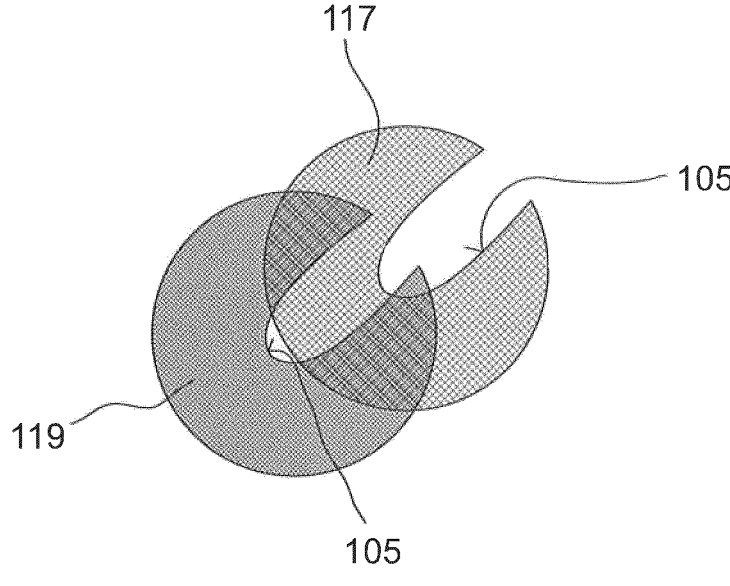
FIGS. 4a and 4b show a unit for setting the fiber content by volume in a third embodiment.
Figure 4B:
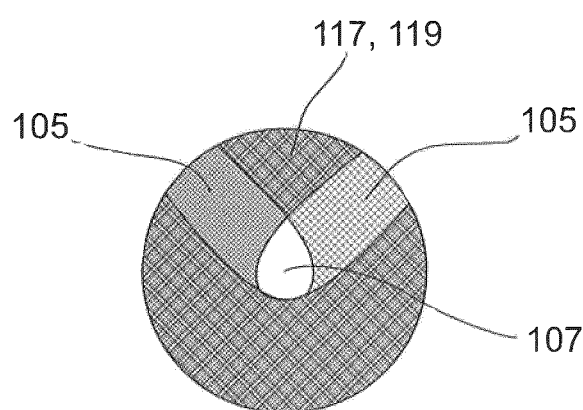

Apart from an embodiment having an upper part 101 and a lower part 103, it is also possible for the unit for setting the fiber content by volume 100 to be designed having two mutually rotatable plates 117, 119, as is illustrated in FIG. 4a, wherein one clearance 105 is configured in each plate 117, 119. In order for the opening to be configured, the plates are positioned on top of one another and are mutually rotated such that the clearances 105 in the two plates 117, 119 point in different directions. This is shown in an exemplary manner in FIG. 4b. The opening cross section can be varied by rotating the plates 117, 119. The opening 107 is open when the clearances 105 in both plates 117, 119 point in the same direction, such that easy placing of the fibers is enabled.

Figure 5:
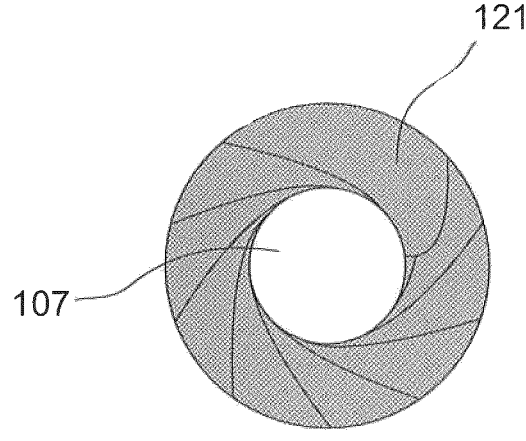
FIG. 5 shows a unit for setting the fiber content by volume in a fourth embodiment.

An adjustable unit for setting the fiber content by volume is illustrated in a fourth embodiment in FIG. 5.

The opening 107 in the case of the embodiment illustrated in FIG. 5 is enclosed by a lamella aperture 121. The permits the opening cross section to be set in a simple manner in that the lamella aperture is opened or closed to a greater degree.

Units for setting the fiber content by volume that are constructed in two parts are particularly suitable in the case an apparatus for impregnating fibers, having a lower part and a lid. In this case, the lower part 103 of the unit for setting the fiber content by volume 100 can be fastened to the lower part of the apparatus, and the upper part 101 of the unit for setting the fiber content by volume 100 can be fastened to the lid. This is described in an exemplary manner hereunder by means of FIGS. 7 to 12.

Figure 6:
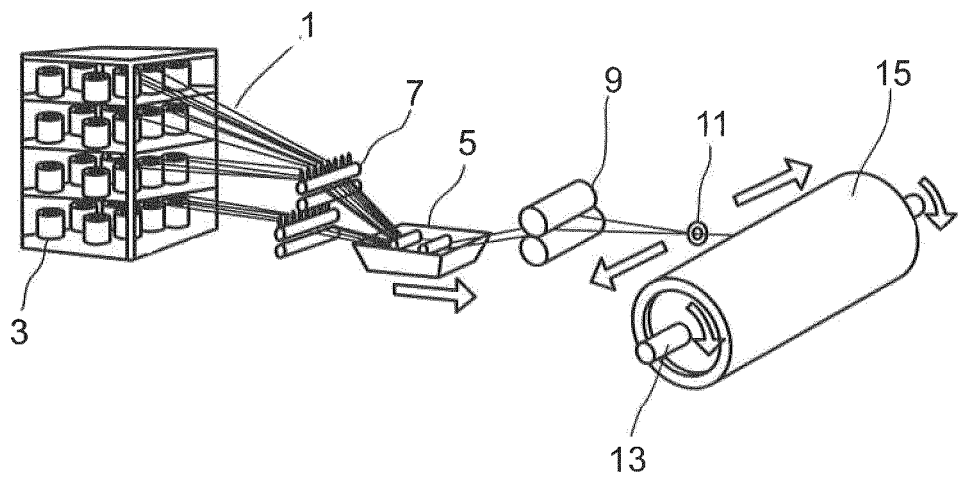
FIG. 6 shows an in-principle illustration of a wet-wrapping method.

FIG. 6 shows a wet-wrapping method in which the apparatus according to the invention for impregnating fibers can be employed in a principle illustration.

In order for components to be produced in a wet-wrapping method, fibers 1 are fed from a reserve 3, here a package creel, to a bath 5. Before entering the bath 5, the fibers 1 are guided through combs 7 in which the fibers 1 are separated from one another, in order for said fibers 1 in the bath 5 to come into overall contact with the matrix material and thus be uniformly impregnated. The bath 5 is adjoined by a squeegee roller pair 9 through which the fibers 1 that have been impregnated in the bath 5 are guided. Excess matrix material is removed from the impregnated fibers 1 on the squeegee roller pair 9. The impregnated fibers 1 are finally guided through a guide ring 11 and wrapped onto a spindle 13. On account thereof, a rotationally symmetrical component 15 is generated. The guide ring 11 is movable in order for a uniform wrapping of the impregnated fibers 1 on the spindle 13 to be maintained, and as is illustrated by arrows herein can be moved in a manner parallel with the axis of the spindle 11.

Figure 7:
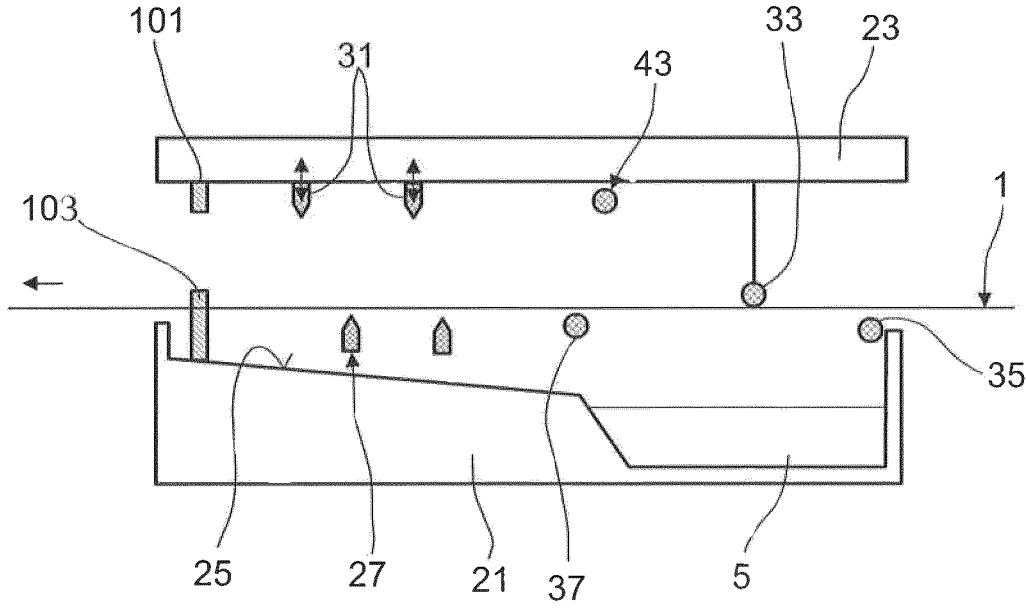
FIG. 7 shows a sectional view of an apparatus according to the invention for impregnating a fibrous structure, with the lid opened.

An apparatus according to the invention for impregnating fibers is illustrated in a sectional view in FIG. 7.

An apparatus in which the fibers 1 can be impregnated with matrix material comprises a lower part 21 and a lid 23. The bath 5 having the matrix material with which the fibers 1 are to be soaked is located in the lower part 21. In the movement direction of the fibers 1 the bath 5 is adjoined by a face 25 that is inclined in the direction of the bath. Wipers 27, each having one wiping edge 29, are disposed above the inclined face 25 on the lower part 21. The fibers 1 in the ongoing operation are guided across the wiping edge 29, and excess matrix material is removed from the fibers 1. The wiped matrix material, on account of the positioning of the wipers 27 above the inclined face, flows back into the bath 5.

Figure 8:
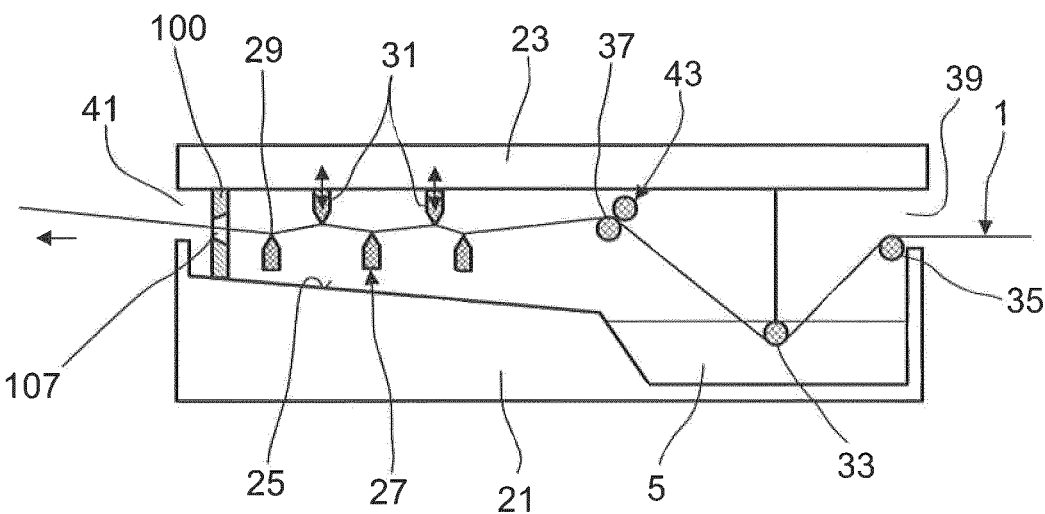
FIG. 8 shows a sectional view of the apparatus according to FIG. 7, with the lid closed.

Wipers 31 which are preferably adjustable for height are attached to the lid 23. The wipers 31 on the lid 23 herein are preferably positioned such that said wipers 31 mesh with the wipers 27 on the lower part 21. Furthermore, a deflection unit 33 by way of which the fibers 1 in the case of a closed lid 23 are pushed into the bath 5 is fitted to the lid 23. This is illustrated in FIG. 8. It can also be derived herefrom that the wipers 27 which are fastened to the lower part 21 mesh with the wipers 31 which are fitted to the lid 23. A slight zigzag profile is thus embossed onto the fibers 1.

In order for the fibers 1 before entering the bath 5 and after leaving the bath 5 not to be damaged on edges on the lower part, a first deflection unit 35 and a second deflection unit 37 are provided on the lower part 21 in the embodiment illustrated here. In the operation, the fibers 1, through a gap 39 between the lower part 21 and the lid 23, run into the apparatus for impregnating fibers and are guided across the first deflection unit 35 on the lower part 21. The fibers 1 subsequently run along the deflection unit 33 which is fitted to the lid 23 and by way of which the fibers 1 are immersed into the bath 5. The deflection unit 33 is adjoined by the second deflection unit 37 across which the fibers 1 are guided before the latter are fed to the wipers 27, 31 on which the excess matrix material is removed. The soaked fibers then leave the apparatus through a second gap 41, and can be fed to further processing, for example to the spindle 13 of a wet-wrapping method. However, alternatively to components which are produced in the wet-wrapping method, any other, for example also planar, components can be produced from the impregnated fibers. To this end, it is possible, for example, for the soaked fibers to be cut to a desired length and to be molded in a suitable mold, so as to form the desired component. However, infeeding to a spindle 13 of a wet-wrapping method is preferred.

On account of the immersion of the fibers 1 in the bath 5, large quantities of matrix material typically adhere to the fibrous structure 1 when the latter leaves the bath 5. In order for a first excess of matrix material to be removed, it is preferable for a squeegee roller 43 which in the case of a closed lid 23 bears on the second deflection unit 37 to be included, as is illustrated here. The soaked fibers are then guided through between the second deflection unit 37 and the squeegee roller 43.

The pressure at which the wipers 27, 31 act on the soaked fibers 1 can be set by setting the height of the wipers 31 that are fitted to the lid 23. On account thereof, it can be set in a targeted manner how much matrix material is to be contained in the soaked fibers 1. In the case of a comparatively high pressure which is achieved in that the wipers 31 that are fitted to the lid 23 mesh more intensively with the wipers 27 on the lower part 21, more matrix material is squeezed from the soaked fibers 1, such that the latter overall contain less matrix material as is the case in a setting of the wipers 31 in such a manner that the latter mesh less intensely with the wipers 27 on the lower part 21, the pressure acting on the fibers thus being lower.

The deflection unit 33 fitted to the lid 23, as well as the first deflection unit 35 and the second deflection unit 37 on the lower part 21, can in each case be configured in a mutually independent manner in the form of a bar or as a rotatable roll. When a deflection unit 33, 35, 37 is configured as a bar, the latter at least in that region in which contact with the fibers 1 takes place, preferably has only rounded edges and is particularly a round bar.

The wipers 27, 31 employed can assume any shape that is known to a person skilled in the art for wipers. The wipers can also be aligned in a direction that deviates by 90° from that of the fibrous structure 1. In the case of the shape and the alignment of the wipers, attention has to be paid only that the soaked fibers 1 are not consequentially damaged. The wipers herein can be designed and aligned such as is already commonplace in the case of baths for soaking fibers.

In order for the fiber content by volume to be set in a precise manner, the wipers 27 are adjoined by a unit for setting the fiber content by volume 100. The fibers 1 are guided through the opening 107 of the unit for setting the fiber content by volume 100. The excess matrix material is wiped at the periphery of the opening 107, drips onto the inclined face 25, and can then flow back into the bath 5. By contrast to the wipers 27 across which the fibers 1 are guided in a preliminary manner, on account of the defined cross-sectional area of the opening 107 only so much matrix material as is required for setting the desired fiber content by volume is removed. A substantially more precise setting is possible than in the case of wipers 27 that push onto the fibers 1 in an alternating manner from above and from below.

Units for setting the fiber content by volume, in which the upper part 101 bears directly on the lower part 103, or which alternatively can also be integrally embodied, are illustrated in each of FIGS. 7 to 11. The embodiment shown in FIGS. 1*a* to 2*b* can be used in the case of a design in two parts, for example. The plates 117, 119, or else the lamella aperture 121, can be used in these cases in order for the opening cross section to be set, for example.

Alternatively, the embodiment shown in FIGS. 3*a* to 3*c* could also be employed, of course. This is illustrated hereunder in FIG. 12.

Figure 9:
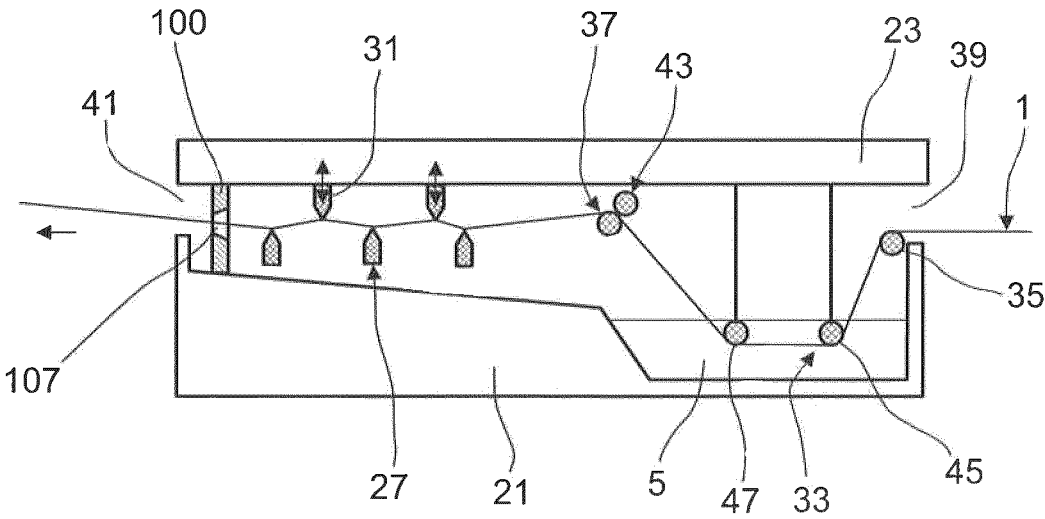
FIGS. 9 to 12 show sectional views of various embodiments of an apparatus according to the invention.
Figure 10:
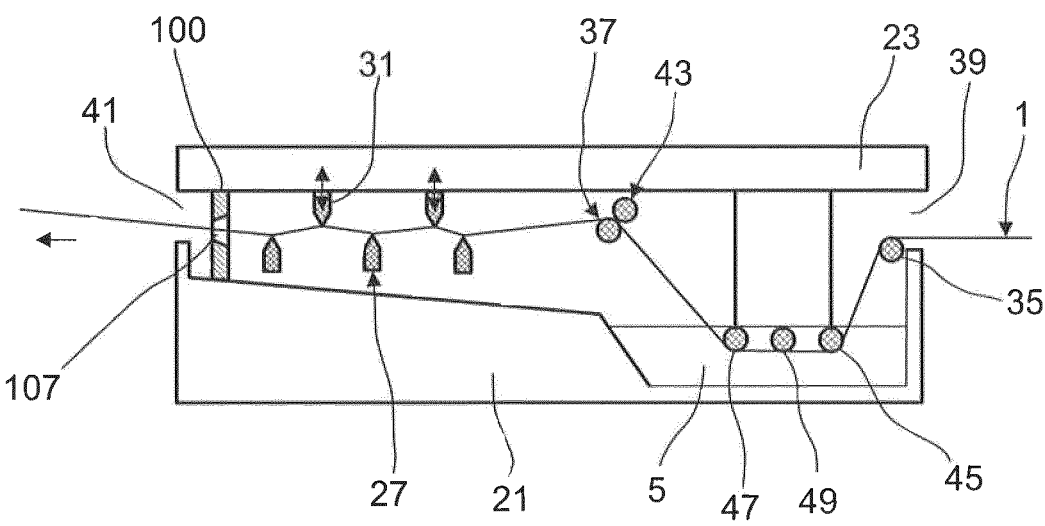
Figure 11:
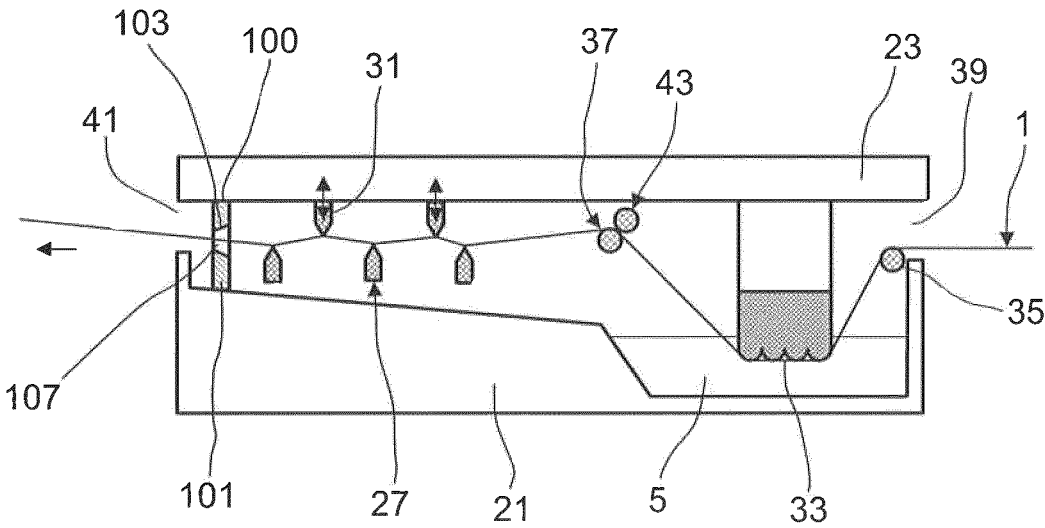

Alternative embodiments for the design of the deflection unit 33 that is fitted to the lid 23 are illustrated in FIGS. 9 to 11. The remaining construction of the apparatus for impregnating fibrous structures corresponds to that of the embodiment illustrated in FIGS. 7 and 8.

The deflection unit 33 in the case of the embodiment illustrated in FIG. 9 comprises a first deflection unit 45 that is fitted to the lid 23, and a second deflection unit 47 that is fitted to the lid 2. Here too, it is possible for the first deflection unit 45 that is fitted to the lid 23 and for the second deflection unit that is fitted to the lid 23 to be configured as a bar or a rotatable roll. The position of the first deflection unit 45 that is fitted to the lid 23, and of the second deflection unit 47 that is fitted to the lid 23 is such that both deflection units 45, 47 in the case of a closed lid 23 are positioned between the first deflection unit 35 and the second deflection unit 37.

On account of the first deflection unit 45 that is fitted to the lid 23, and of the second deflection unit 47 that is fitted to the lid 23, the distance which is traveled by the fibers in the bath 5 can be extended, and the dwell time of the fibers in the bath 5 at the same speed can be increased, in relation to only one deflection unit as is illustrated in FIGS. 7 and 8.

There can also be more deflection units that are embodied as a rotatable roll or a bar provided on the lid 23, but this is meaningful only when said additional deflection units are in contact with the fibers 1 and the distance which the fibers 1 travel in the bath 5 is further extended.

Alternatively to further deflection units on the lid 23, it is also possible for an additional deflection unit 49 in the bath 5 to be provided in order for the distance in the bath 5 to be extended and optionally for the impregnation to be improved. As is illustrated in FIG. 10, said additional deflection unit 49 is located between the first deflection unit 45 that is fitted to the lid 23, and the second deflection unit 47 that is fitted to the lid 23. On account of the additional deflection unit 49 that is located in the bath, the fibers are pushed against the deflection units 45, 47 that are fitted to the lid and are simultaneously imparted pressure at the additional deflection unit 49. On account thereof, matrix material is pushed between the fibers and any gas cushions that are optionally contained between the fibers of the fibers are forced out such that a uniform and above all also complete impregnation is achieved.

Apart from individual bars or rotatable rolls, such as are illustrated in FIGS. 7 to 10, the deflection unit 33 can also be configured in the form of a ram having a structured surface. This is illustrated in an exemplary manner in FIG. 11 for a deflection unit having an undulated surface. The structure of the surface can however also assume any other shape. Attention has only to be paid to be fibers not being damaged by the structure of the surface of the deflection unit 33 that is configured as a ram.

Figure 12:
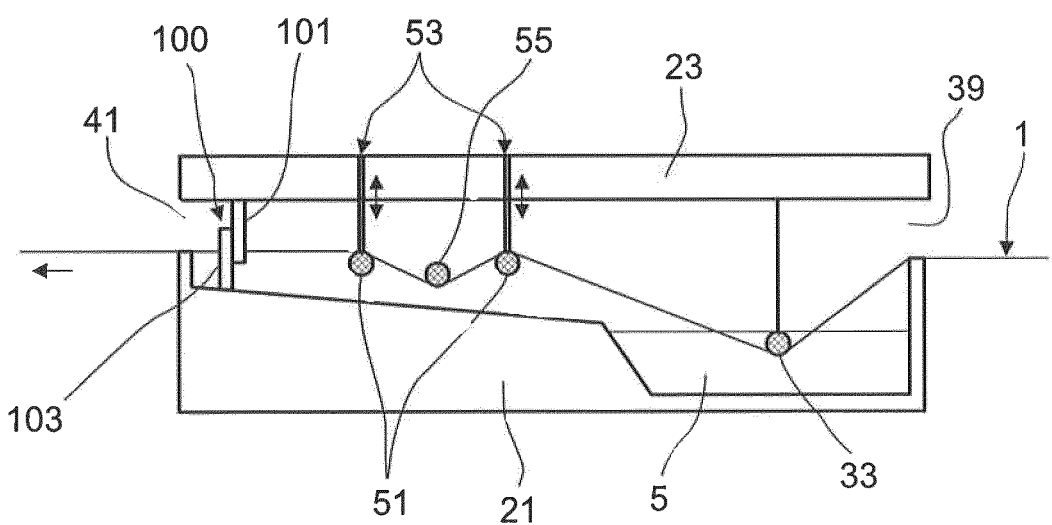

An embodiment having an alternative design of the drip unit and having an adjustable unit for setting the fiber content by volume is illustrated in FIG. 12.

As opposed to the embodiments illustrated in FIGS. 7 to 11, the drip unit here is not designed having mutually meshing wipers 27, 31.

In the case of the embodiment illustrated in FIG. 12, deflection units 51, for example as a bar or a rotatable roll, are provided in the drip unit on the lower part 21, and height-adjustable wipers 53 are provided on the lid 23. The fibers 1 are guided through between the deflection units 51 and the wipers 53, wherein the fibers 1 by way of the deflection units 51 are pushed against the wipers 53. The wipers 53 in terms of the height thereof can be adjusted such that the latter can be pushed against the deflection units 51 at an adjustable pressure. The quantity of matrix material in the soaked fibers can be set on account thereof. A further deflection unit 55 is fitted to the lid between the wipers 53. It is ensured by way of said further deflection unit 55 that the fibers 1 are pushed against the deflection units 51 even when there is a gap between the deflection unit 51 and the wiper 53.

As opposed to the preceding embodiments, it is shown here how a unit for setting the fiber content by volume 100 having an adjustable opening cross section such as is illustrated in FIGS. 3a to 3c can be employed. In order to be able to displace the upper part 101 toward the lower part 103, the upper part 101 in the embodiment illustrated here in the running direction of the fibers 1 lies ahead of the lower part 103 of the unit for setting the fiber content by volume 100. Alternatively, it is of course also possible for the upper part 103 to be disposed such that the latter in the running direction of the fibers is positioned behind the lower part 103. A further possibility would also be for either the upper part 101 or the lower part 103 to be designed having a slot that runs transversely to the running direction of the fibers 1, and for the lower part 103 or the upper part 101 to be guided in a corresponding manner in this slot.

In order for the opening cross section to be set, the upper part 101 and/or the lower part 103 are/is fitted so as to be vertically displaceable. Additionally or alternatively, it is also possible for the upper part 101 and/or the lower part 103 to be fitted so as to be horizontally displaceable. To this end, the upper part 101 and/or the lower part 103 can be fitted onto a rail that runs transversely to the running direction of the fibers 1, for example, and be displaced on the rail in order for the opening cross section to be set.

In all embodiments it is possible for sealing elements to be provided in the region of the gaps 39, 41 through which the fibers are guided into the apparatus or the soaked fibers are guided out of the latter, respectively, in order for the apparatus to be sealed in respect of ambient air entering thereinto. This is advantageous in particular when a polymer or a polymer precursor compound, respectively, which chemically reacts with a component of the air, for example with water that is contained in the air, is used as a matrix material. Additionally, an inflow and an outflow for a flushing gas can be provided in order for the gas space above the bath to be flushed with the flushing gas.

In all embodiments illustrated here, the apparatus for impregnating fibers in the case of an embodiment having a unit for setting the fiber content by volume 100 in two parts, in which the lower part 103 is fitted to the base of the apparatus and the upper part 103 is fitted to the lid 23 of the apparatus, permits a simple start-up. Independently of whether or not matrix material is already contained in the bath 5, it is possible in the case of an opened lid 23 for the fibers 1 to be placed in a simple manner. On account of the deflection units and wipers on the lid 23, the fibers are pushed against the respective deflection units and wipers on the lower part 21 and into the bath 5, thus assuming the envisaged path. No complicated threading of the fibers or draining of the matrix material from the bath is therefore required for placing the fibers around a roller when using the apparatus described herein. Accordingly, the fibers can also be placed into the clearance 105 in the lower part 103, the opening 107 being closed by the respective positioning of the upper part 103 that is fastened to the lid 23 when the lid is being closed, such that the fibers 1 in the case of a closed lid lie in the opening 107 that is closed all around. The fibers can be removed again in a correspondingly simple manner upon opening of the lid 23, even when the apparatus is switched off.

Additionally, by removing and replacing the lower part 21 it is possible in a very simple manner for either another matrix material to be supplied on demand, or for a lower part 21 to be removed on demand for cleaning or disposal and to be replaced by a new lower part 21. On account thereof it is also possible in particular for the apparatus to continue to operate even in the case of any required cleaning of the bath, in that a new lower part is easily employed while the previous lower part is being cleaned.

Figure 13:
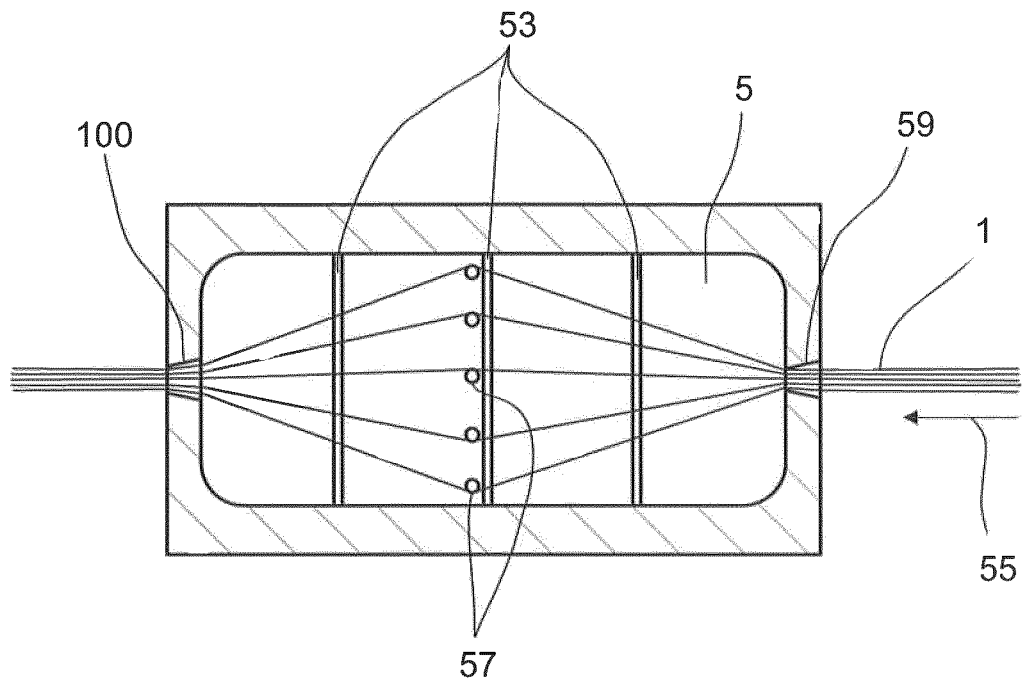
FIG. 13 shows a plan view of a device for impregnating fibers, in a second embodiment.
Figure 14:
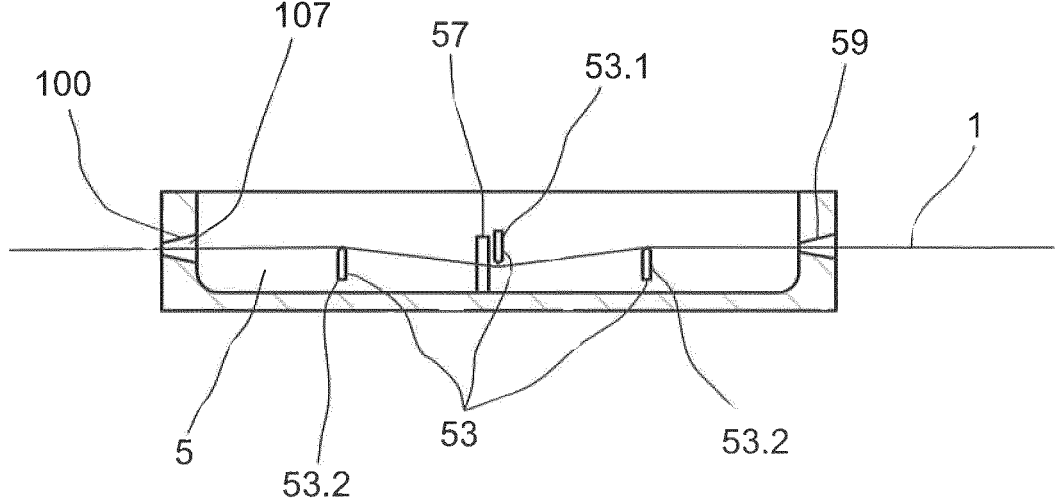
FIG. 14 shows a sectional illustration of the device shown in FIG. 13.

A device for impregnating fibers, in which the fibers are fed as bundles, are singularized for impregnation, and are subsequently gathered again, is illustrated in FIGS. 13 and 14, wherein FIG. 13 shows the device in the plan view, and FIG. 14 is a sectional illustration.

In the embodiment illustrated in FIGS. 13 and 14 the fibers 1 are fed through an opening 59 in order for the fibers to be fed into the bath 1 with matrix material. The opening 59 for feeding the fibers 1 in the embodiment illustrated here is designed so as to be conical in order for the threading of the fibers 1 to be facilitated. The cross-sectional face of the opening 59 at the tightest cross-section thereof preferably corresponds to the cross-sectional face of the infed fibers 1.

Upon entering the bath 5, the infed fibers 1, which are fed either as a fiber bundle or as a bundle from a plurality of rovings, are split. Splitting herein is performed either into individual fibers or into bundles having a lower number of fibers, or in the case of an infed bundle from rovings, into individual rovings, so as to guarantee improved soaking of the fibers 1 with the matrix material that is contained in the bath 5. In order to be able to split the fibers 1, deflection elements 57 about which the infed individual fibers, groups of a lower number of fibers, or individual rovings are guided, are positioned in the bath 5. The number of the deflection elements 57 herein depends on the number of individual fibers, groups of a lower number of fibers, or individual rovings, which are guided through the bath 5. The individual fibers, groups from a lower number of fibers, or individual rovings, are gathered again behind the deflection elements 57 and fed to the unit for setting the fiber content by volume 100. The installation for setting the fiber content by volume 100 in the embodiment illustrated in FIGS. 13 and 14 is likewise configured as an opening 107 in the wall of the bath 5. The fibers are guided through the opening 107 which for improved threading of the fibers is likewise configured with a decreasing cross-sectional face.

Besides the variant illustrated here, in which the tightest cross-section is on the outlet side of the fibers, it is also possible for the opening 59 for feeding the fibers, and the opening 107 of the unit for setting the fiber content by volume 100, to be designed such that the cross-sectional face initially decreases in the running direction of the fibers in operation, until the minimal cross-sectional face is reached, and subsequently increases again.

The minimal cross-sectional face of the opening 59 for feeding the fibers preferably corresponds to the cross-sectional face of the fibers that are fed through the opening 59. On account thereof, sealing in relation to the matrix material by way of which the fibers are soaked and which is contained in the bath 5 can be achieved to a large extent on account thereof.

On account of the design of the opening 107 of the unit for setting the fiber content by volume 100, only so much matrix material as is required in order for the fibers to be soaked exits the bath also here. The soaked fibers moreover act as a seal here, by way of which an outflow of the matrix material from the bath 5 is prevented.

In order for the fibers 1 to be as far as possible completely soaked and for gas, in particular air, that is still contained in the fibers to be expelled, wipers 53 are additionally provided in the bath 5. The wipers herein, as is illustrated here, are preferably disposed above and below the fibers 1, wherein the wiping edges are aligned such that the wipers 53.1, which act on the fibers 1 from above, press the fibers onto the wipers 53.2, which act on the fibers 1 from below, and in a corresponding manner the wipers 53.2 that act on the fibers 1 from below push the fibers 1 against the wipers 53.1 that act on the fibers 1 from above. The pressure that acts on the fibers 1 and thus the effectiveness of the wipers 53 for expelling the gas can be set by the height by way of which the wipers 53 engage in one another.

Since the opening 59 for feeding the fibers 1 and the unit for setting the fiber content by volume 100 illustrated in the embodiment illustrated in FIGS. 13 and 14 lie below the liquid level of the matrix material, the fibers for the operation are placed first, and the matrix material is filled into the bath 5 only once the fibers 1 have been placed therein. Facilitated placing of the fibers 1 can be achieved, for example, in that the wipers 53.1 which act on the fibers 1 from above are inserted only once the fibers have been placed. To this end it is possible, for example, for the wiper 53.1 to be guided in a groove in the wall of the bath 5, or for the wipers 53.1 that act on the fibers 1 from above to be placed onto the wall of the bath 5 by way of a support or a lid that closes the bath. The wipers 53.2 that act on the fibers from below can be fastened to the base of the bath 5, for example.

In order for a good result to be achieved by the wipers 53, at least three wipers are provided, wherein the wipers can in each case act on the fibers in an alternating manner from above and from below. In the case of three wipers, two wipers 53.2 can act on the fibers from below and one wiper 53.1 can act from above, as is illustrated here for example. However, reversed arrangement is alternatively also possible, in which two wipers act on the fibers from above, and one wiper acts on the fibers from below. The position of the opening 59 for feeding the fibers 1 herein is preferably such that the opening 59, in the case of a wiper that acts on the fibers from above being the first wiper behind the opening 59 for feeding the fibers, lies above the wiping edge of the first wiper, and in the case of a wiper acting on the fibers from below being the first wiper behind the opening 59 for feeding the fibers, lies below the wiping edge of the first wiper. Accordingly, the opening of the unit for setting the fiber content by volume, in the case of a wiper 53.1 which acts on the fibers 1 from above and which in the running direction of the fibers lies as the last wiper ahead of the opening of the unit for setting the fiber content by volume, lies above the wiping edge, and in the case of a wiper 53.2 that acts from below lies below the wiping edge. The fibers, on account of the corresponding positioning of the opening 59 for feeding the fibers, and of the opening of the unit for setting the fiber content by volume 100, are also pressed against the wiping edge of the first and of the last wiper 53.

Figure 15:
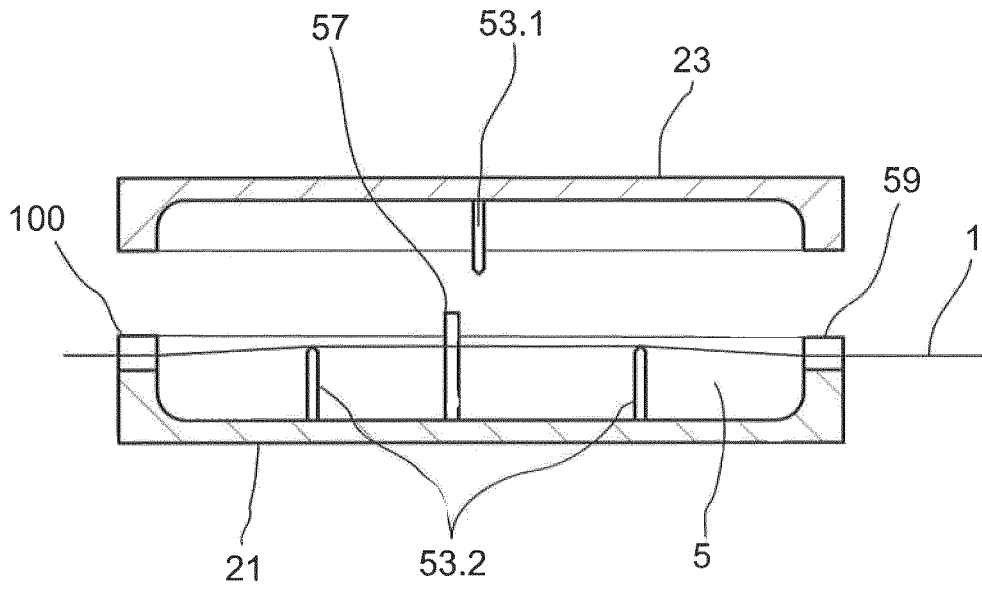
FIG. 15 shows a device for impregnating fibers, in a third embodiment, having a lid for closing the device in the opened state.
Figure 16:
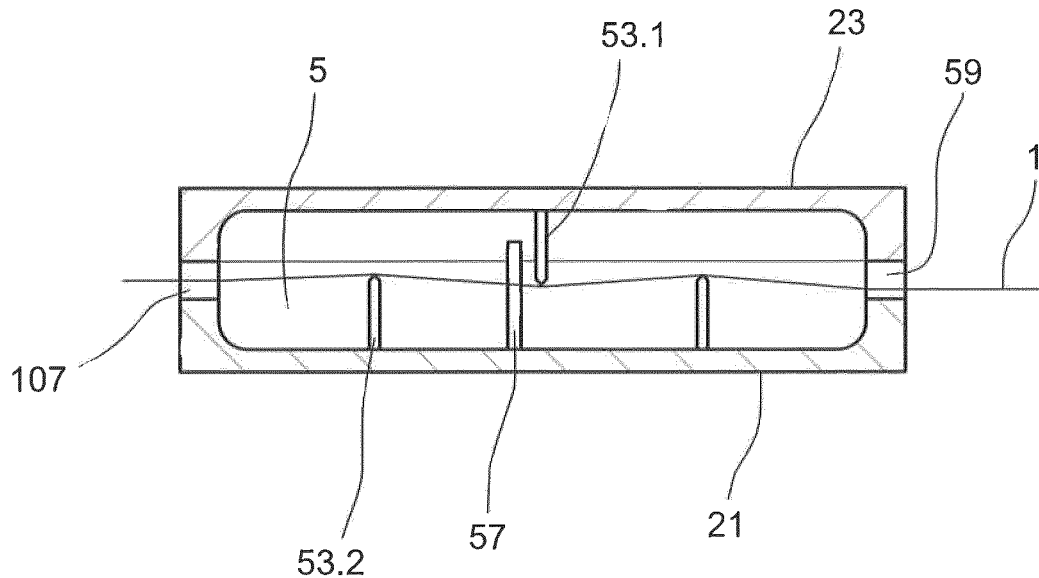
FIG. 16 shows the device for impregnating fibers, illustrated in FIG. 15, in the closed state.

An embodiment of the device for impregnating fibers, which in terms of the construction thereof largely corresponds to that shown in FIGS. 13 and 14, but as opposed to the latter is closable by way of a lid, is shown in FIGS. 15 and 16.

Fibers 1, also in the case of the embodiment illustrated in FIGS. 15 and 16, are guided into the bath 5 through an opening 59 for feeding the fibers. The wipers 53 which act on the fibers from above and from below are located in the bath 5. The wipers 53.2 which act on the fibers from below, are fastened to the lower part 21, and the wipers 53.1 which act on the fibers from above are fastened to the lid 23.

In order for the placing of the fibers to facilitated, the lower part 21 and the lid 23 are designed such that the opening 59 through which the fibers are fed, and the opening which forms the unit for setting the fiber content by volume 100, are designed such that in each case one part of the openings, preferably more than half of the opening, is configured in the lower part 21, and the remaining part of the opening is configured in the lid 23. This permits the fibers to be placed in a simple manner from above into the opening 59 for feeding the fibers, and into the opening 107 that forms the unit for setting the fiber content by volume 100. Once the fibers 1 have been placed, and the fibers have been split into individual fibers, groups of fewer fibers, or in the case of a bundle of rovings into individual rovings, which are guided about the deflection units 57, the lid 23 is placed on top as is illustrated in FIG. 16. The opening 59 through which the fibers are fed, and the opening 107 of the unit for setting the fiber content by volume 100 are closed by way of the lid. The wipers 53.1 that are fastened to the lid 23 are simultaneously pressed onto the fibers such that the fibers 1 in turn are pressed onto the wipers 53.2 that are fastened on the base. On account thereof, the wipers 53.2 that are fastened on the base act on the fibers from below, and the wipers 53.1 that are fastened to the lid act from above.

After the lid 53 is closed, the matrix material is filled into the bath 5 by way of a suitable infeed opening which is preferably closable. The space that is formed between the lower part 21 and the lid 23 herein is preferably completely filled with the matrix material. The infeed opening for the matrix material herein is preferably located in the lid such that the matrix material can be filled from above into the interior space which is enclosed by the lower part 21 and the lid 23. A sealing element for sealing the bath is incorporated between the lower part 21 and the lid 23. Any arbitrary seal known to a person skilled in the art is suitable to this end. It is thus possible, for example, for a groove to be configured in the lower part 21 or in the lid 23, and for a seal, for example an O-ring, to be placed in the groove.

The position of the opening 59 for feeding the fibers 1, and of the opening 107 of the unit for setting the fiber content by volume 100 enable the entire device for impregnating fibers to be positioned in an arbitrary manner, since the fibers on account of the filling of the entire interior space with the matrix material are sufficiently soaked even when the device is rotated, for example, by an arbitrary angle about the longitudinal axis or the transverse axis. This has the advantage that the device for impregnating the fibers can be aligned in a suitable manner when the fibers in continuous or discontinuous winding processes are fed to the winding core from different directions. The individual devices for impregnating fibers herein are preferably aligned such that the fiber after exiting the unit for setting the fiber content by volume does not have to be deflected any more between the device for impregnating the fibers and the winding core. It is ensured in this way that no matrix material is squeezed out of the fiber by a deflection device, for example a roller, but the fibers are wound onto the winding core having the fiber content by volume by way of which said fibers exit the device for impregnation.

Figure 17:
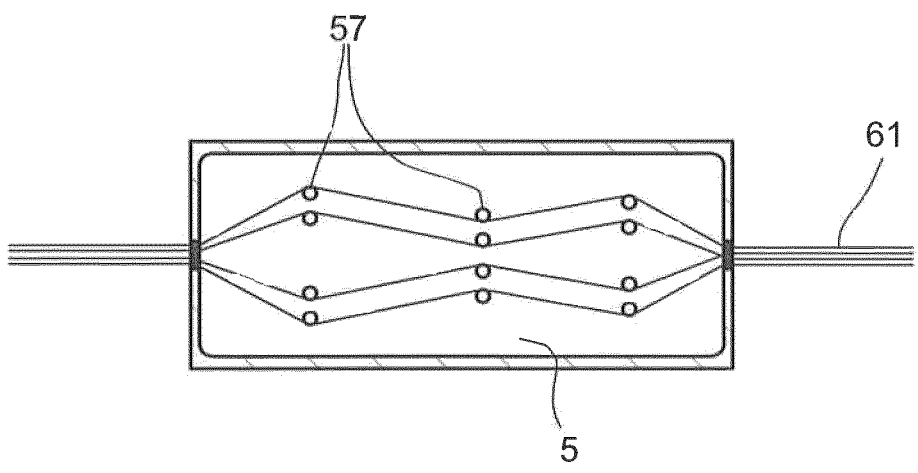
FIG. 17 shows a device for impregnating fiber tapes in the plan view.
Figure 18:
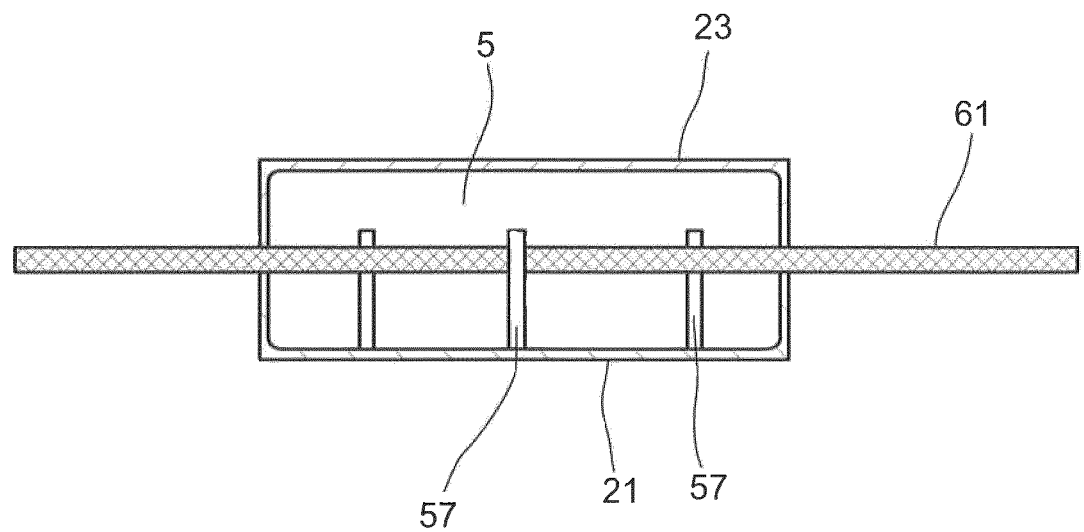
FIG. 18 shows the device from FIG. 17 in the side view.

A device for impregnating fiber tapes is illustrated in the plan view and in this side view in FIGS. 17 and 18. The functional mode of the device herein largely corresponds to the functional mode of the devices as are illustrated in FIGS. 13 to 16.

The device illustrated in FIGS. 17 and 18 also preferably has a lower part 21 and a lid 23, like the device illustrated in FIGS. 15 and 16, wherein the openings through which the fiber tapes 61 are guided are configured in the lower part 21 and are open on the upper side, and are closed by way of the lid 23 once the fiber tapes 61 have been placed therein. Since the fiber tapes are flat, the openings in the lower part in this case preferably have a rectangular cross-section, wherein the height of the opening 59 for feeding the fiber tapes corresponds to the width of the fiber tapes 61, and the width of the opening 59 for feeding the fiber tapes corresponds to the thickness of the infed stack from a plurality of fiber tapes 61. The opening 107 of the unit for setting the fiber content by volume is likewise preferably rectangular, wherein the cross-sectional face is calculated here so as to depend on the desired fiber content by volume, as has been described above.

As opposed to individual fibers or individual rovings, or else groups having a lower number of fibers, it is necessary in the case of fiber tapes 61 by virtue of the geometry that both the deflection elements as well as the wipers act on the wide face of the fiber tapes 61. Therefore, as opposed to the embodiments illustrated in FIGS. 13 to 16, no deflection elements and wipers that in relation to the deflection units 57 are rotated by 90° are used for the impregnation of fiber tapes, but at least two, preferably at least three, deflection units 57 are used for each fiber tape 61, said deflection units 57 being positioned such that a fiber tape 61 that is guided by way of the deflection units 57 is in each case pressed by one deflection element 57 against the neighboring deflection element 57. Zig-zag guiding of the fiber tapes 61 in the bath 5 results on account thereof, and the deflection elements 57 simultaneously act also as wipers. Of course, such guiding is alternatively also possible for individual fibers, groups from a low number of fibers, or individual rovings, wherein by virtue of the required space and of the lower complexity in terms of assembly and of the lower complexity for placing the fibers, it is preferable for deflection elements 57 and wipers that in relation to said deflection elements 57 are rotated by 90° to be provided.

Figure 19:
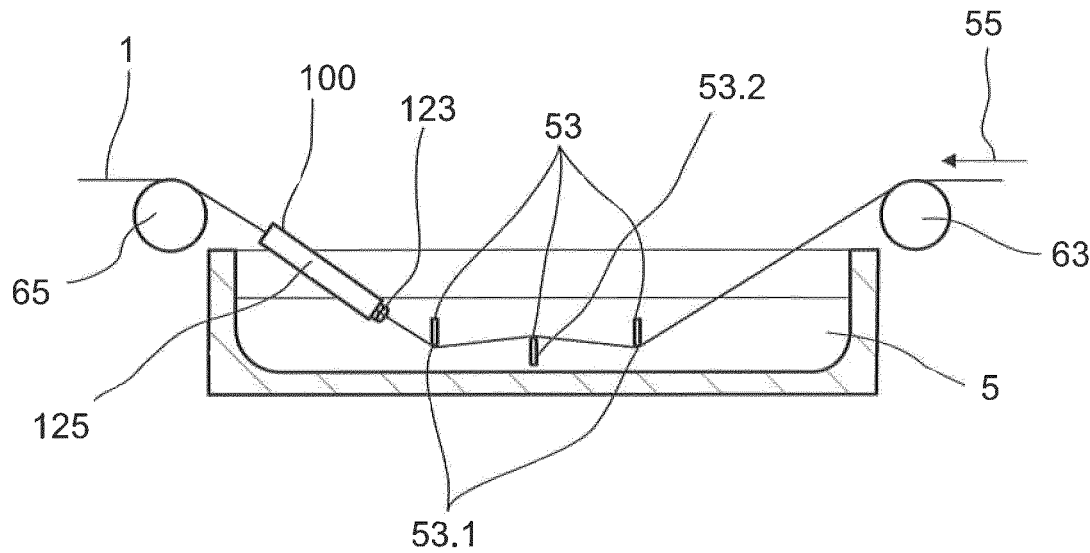
FIG. 19 shows a sectional illustration of a device for impregnating fibers, having a unit for setting the fiber content by volume that is submerging into the bath.
Figure 20:
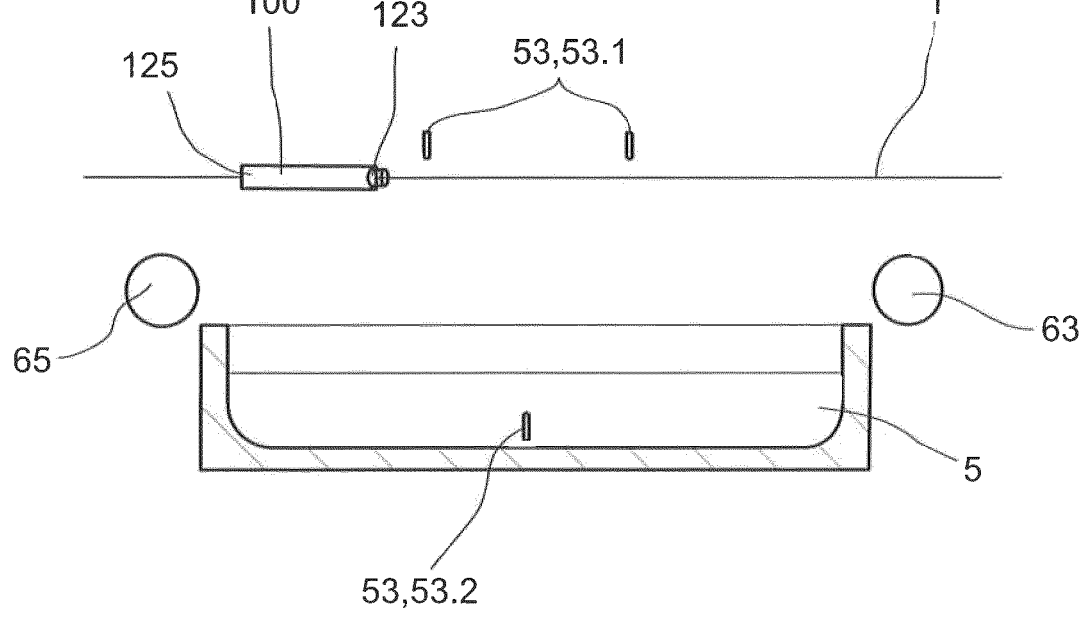
FIG. 20 shows the device for impregnating fibers, shown in FIG. 19, prior to the fibers being incorporated in the bath.

A further embodiment of a device for impregnating fibers is illustrated in FIGS. 19 and 20. FIG. 19 shows the device in the ongoing operation during impregnating, and FIG. 20 shows the device prior to the fibers being incorporated into the bath.

As opposed to the devices illustrated in FIGS. 13 to 18, in the case of the device illustrated in FIGS. 19 and 20 the fibers 1 are not guided into the bath 5 through an opening 59 for feeding the fibers 1, said opening 59 in operation being located below the liquid level of the matrix material, but are guided by way of a deflection roller 63 from above into the bath 5. In order for the fibers 1 after the deflection roller 63 to be guided into the bath, a wiper 53.1 is first provided in the running direction 55 of the fibers 1, said wiper 53.1 acting on the fibers from above. The fibers 1, after passing the deflection roller 63, are pushed into the bath by way of the wiper 53.1 which acts on the fibers from above. The first wiper 53.1 which acts on the fibers 1 from above is adjoined by at least one wiper 53.2 which acts on the fibers 1 from below, and by a further wiper 53.1 which acts on the fibers from above. Even further wipers can also be provided, wherein the last wiper 53 in the running direction of the fibers 1 is a wiper 53.1 that acts on the fibers from above. The fibers after the last wiper 53.1 are guided through the installation for setting the fiber content by volume 100, said installation by way of one side being submerged in the matrix material and by way of the other end, through which the fibers exit the installation for setting the fiber content by volume 100, lying outside the matrix material. Subsequent to the installation for setting the fiber content by volume 100, the soaked fibers are guided by way of a further deflection roller 65.

Instead of the deflection rollers 63, 65 which are illustrated in FIGS. 19 and 20, it is also possible for other arbitrary suitable deflection roller is to be used, such as are described above as deflection units 35, 37 in FIGS. 7 to 11.

In order for the fiber content by volume of the impregnated fibers to be set, the unit for setting the fiber content by volume 100 in the embodiment illustrated here has a nozzle 123 and a duct 125. The nozzle has the minimal cross-sectional face which is dimensioned such that the desired fiber content by volume is achieved. The nozzle 123 is adjoined by the duct 125, wherein the duct 125 has a cross-sectional face which is so large that the soaked fibers which are guided through the duct 125 do not contact the walls of the duct. In order to prevent that air bubbles or gas bubbles are incorporated into the fibers when impregnating, the unit for setting the fiber content by volume 100 by way of the nozzle 123 submerges into the matrix material in the bath 5. The soaked fibers, after passing the nozzle, can be guided out of the matrix material in the bath 5 through the duct 125 that adjoins the nozzle, without said fibers once again coming into contact with the matrix material, such that the fiber content by volume after passing the nozzle is no longer changed. To this end, the duct 125 is connected to the nozzle in a liquid-tight manner such that no matrix material can make its way out of the bath 5 into the duct 125. The end of the duct 125 through which the fibers exit, in operation is located outside the matrix material.

In order for the fibers to be able to be placed into the device for impregnating fibers in a simple manner, the wipers 53.1 that act on the fibers from above, and the unit for setting the fiber content by volume 100, are preferably fitted so as to be retrievable from the bath 5. This is schematically illustrated in FIG. 20, in which the device is shown prior to the fibers 1 being placed therein. The fibers 1 to be impregnated are first located outside the matrix material, above the bath 5. The fibers 1 are first placed into the unit for setting the fiber content by volume 100. The wipers 53.1 which act on the fibers 1 from above are likewise still located outside the bath 5. Once the fibers 1 have been placed into the unit for setting the fiber content by volume 100, said fibers 1 by way of the wipers 53.1 that act on the fibers 1 from above are pressed downward. To this end, the wipers 53.1 can be guided, for example, in the groove in the container that contains the bath 5, or alternatively can be fitted on the upper edge of the container that contains the bath 5 by way of the support. In order for the unit for setting the fiber content by volume 5 to be positioned such that said unit for setting the fiber content by volume by way of one side, preferably the side that has the nozzle 123, can submerge into the matrix material that is contained in the bath, and the other end of the unit for setting the fiber content by volume 100, from which the impregnated fibers can exit again, is outside the matrix material, the unit for setting the fiber content by volume is preferably fitted so as to be movable on a suitable mounting by way of which the unit for setting the fiber content by volume 100 can be fitted to the container that contains the bath 5.

The device shown in FIGS. 19 and 20 has the advantage that the fibers, as is the case also in the devices shown in FIGS. 7 to 12, can be placed in a simple manner without the matrix material having to be removed from the bath 5.

Figure 21:
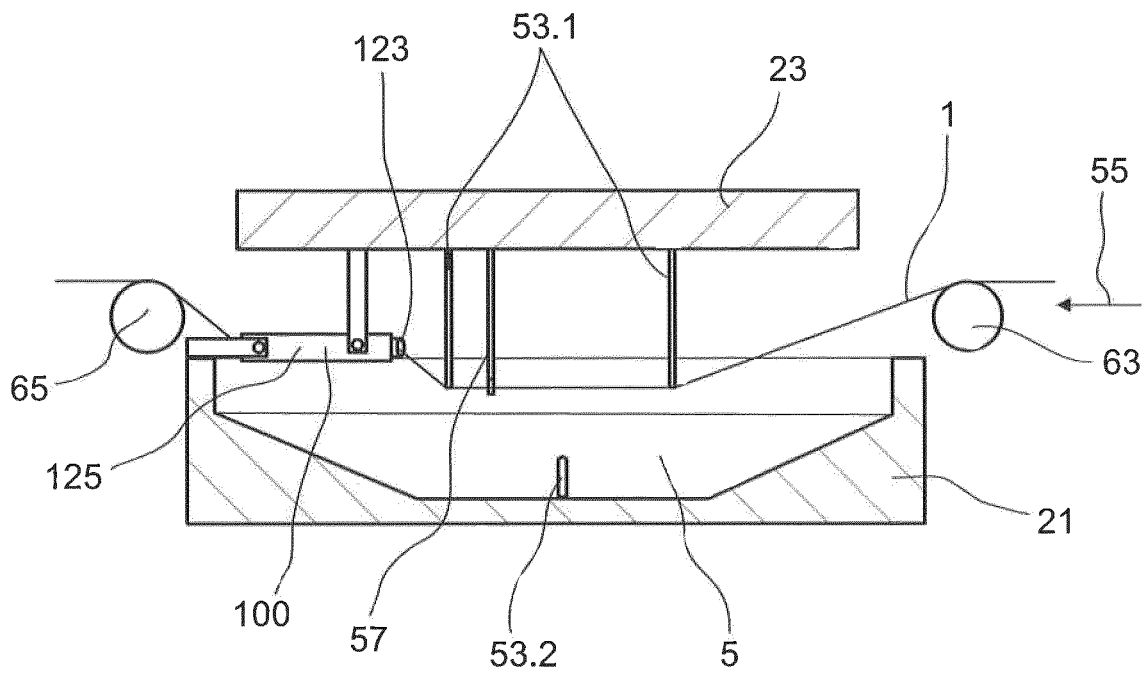
FIG. 21 shows a device for impregnating fibers, having a unit for setting the fiber content by volume, submerging into the bath, having a lid for closing the bath, the lid being opened.
Figure 22:
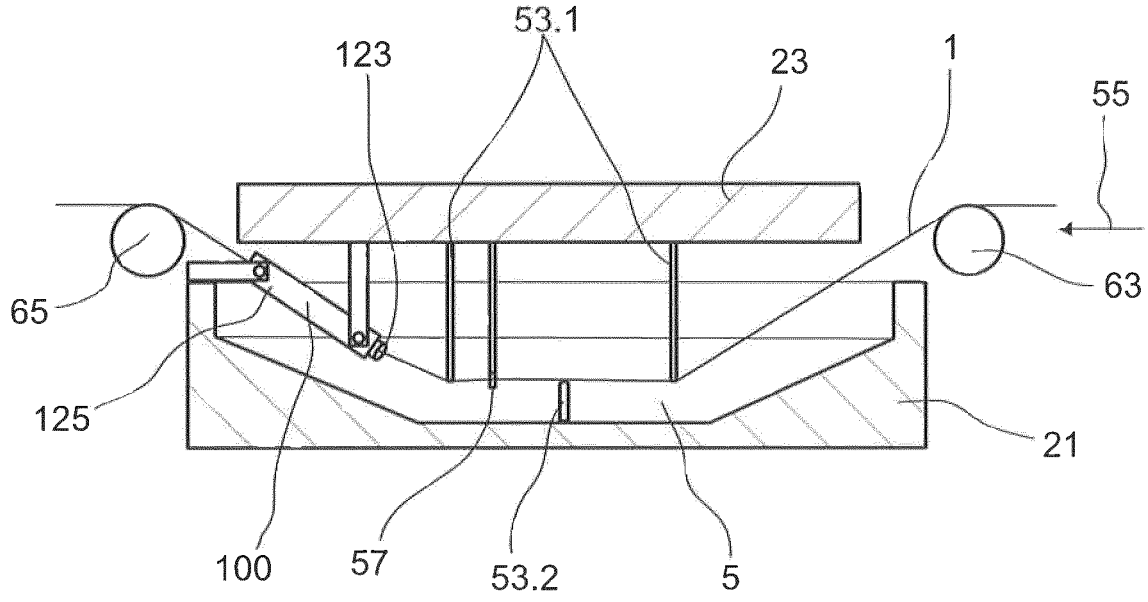
FIG. 22 shows the device shown in FIG. 21, having a closed lid.

A variant of how the wipers 53.1 that act on the fibers from above, and the unit for setting the fiber content by volume 100, can be fitted is illustrated in FIGS. 21 and 22. Here, the wipers 53.1 and the unit for setting the fiber content by volume 100 are fastened to a lid 23 which is placed onto the lower part 21 that contains the bath 5. This embodiment in FIG. 1 is shown with a partially opened lid, and in FIG. 22 is shown with a closed lid.

The unit for setting the fiber content by volume herein by way of a first arm 127 is fitted to the lid 21, and by way of a second arm 129 is fitted to the lower part 21. The first arm 127 and the second 129 are in each case fastened to the duct 125 of the unit for setting the fiber content by volume 100 so as to be rotatable about an axis that runs perpendicularly to the fibers 1. On account thereof, the unit for setting the fiber content by volume 100, when closing the lid 23, is moved to the desired position. The fibers are pressed into the matrix material in the bath 5 by way of the wipers 53.1 which are fastened to the lid 21 and act on the fibers 1 from above, wherein the fibers in the case of a closed lid by way of the wipers 53.1 that act on the fibers 1 from above are pressed against the wipers 53.2 that act on the fibers from below. The wiper that acts on the fibers 1 from below herein is fastened to the lower part 21.

In the case of the embodiments shown in FIGS. 19 to 22 the fibers can be fed as a fiber bundle or as a bundle from a plurality of individual rovings, and in the bath 5 can be split into individual fibers, units from a lower number of fibers, or individual rovings, in order for the fibers to be able to be completely soaked, wherein the fibers or rovings after soaking are gathered again, before said fibers or rovings are guided through the unit for setting the fiber content by volume. Splitting herein, as in the embodiments already described in the context of FIGS. 13 to 16, can be performed by using deflection units 57 about which the individual fibers, units from a lower number of fibers, or rovings are guided.

In the case of the embodiments shown in FIGS. 19 to 22 it is alternatively also possible for the fibers to be fed so as to already be split into individual fibers, units from a low number of fibers, or individual rovings, to be gathered prior to entering the unit for setting the fiber content by volume 100, and thus to be retrieved as a bundle from the device for impregnating fibers. Such an embodiment is illustrated in exemplary manner in the plan view in FIG. 23.

In particular when the impregnated fibers are used for producing wound components, for example pipes, it is necessary for the fibers after impregnation to be split again into individual fibers, groups of few fibers, or individual rovings, those then being fed to a winding mandrel about which the impregnated fibers are used for producing the wound component. This splitting of the fibers after the impregnation is likewise illustrated in exemplary manner in FIG. 23, can however also be carried out thus for all other embodiments shown here.

After exiting the unit for setting the fiber content by volume 100, the fibers 1 are first guided through a guide 73 and subsequently fed to a comb 67. The individual fibers, units of a low number of fibers, or individual rovings, in the comb 67 are in each case guided around one prong 69 of the comb 67 such that said fibers or rovings can subsequently be fed lying beside one another in parallel to the winding mandrel 71 or the winding core about which the fibers are then wound lying beside one another in parallel. In order for the component to be produced, either the winding mandrel 71 or the winding core is moved in a reciprocating manner along the axis 75 thereof, or the comb 67 is moved in a reciprocating manner parallel with the axis 75 of the winding mandrel 71 or of the comb, so as to produce a component having a plurality of fiber tiers which lie on top of one another so as to be rotated in relation to one another at an angle. The angle at which the fibers of the individual tiers are rotated in relation to one another herein is set by way of the rotating speed of the winding mandrel 71 or of the winding core, and by way of the reciprocating movement of the winding mandrel 71 or of the winding core, or by way of the reciprocating movement of the comb 67, respectively.

Figure 24:
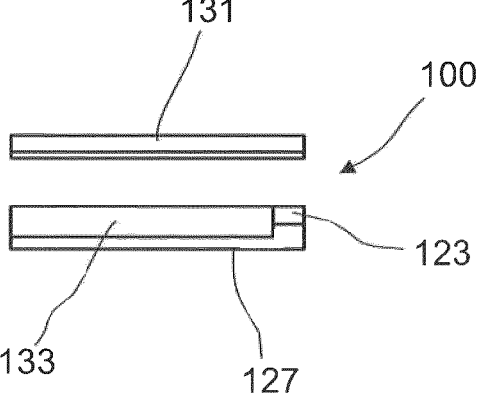
FIGS. 24 and 25 show a unit for setting the fiber content by volume, as can be used in a device for impregnating fibers as illustrated in FIGS. 19 to 23.
Figure 25:
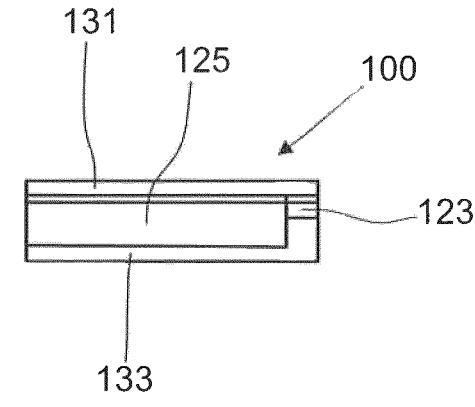

In order for the fibers to be able to be placed in a simple manner in the case of the device as is illustrated in a plurality of embodiments in FIGS. 19 to 23, it is particularly advantageous for the unit for setting the fiber content by volume 100 to be embodied in two parts. This is shown in an exemplary manner in FIGS. 24 and 25. To this end, the unit for setting the fiber content by volume has a lower part 133 and a lid 131. The nozzle 123 is configured in the lower part 133 and is positioned such that said nozzle 123 in the case of an opened lid 131 is opened toward the top. The fibers in the case an opened lid 131 can thus be placed into the lower part 133 in a simple manner, the lid being closed once the fibers 1 have been placed.

Figure 23:
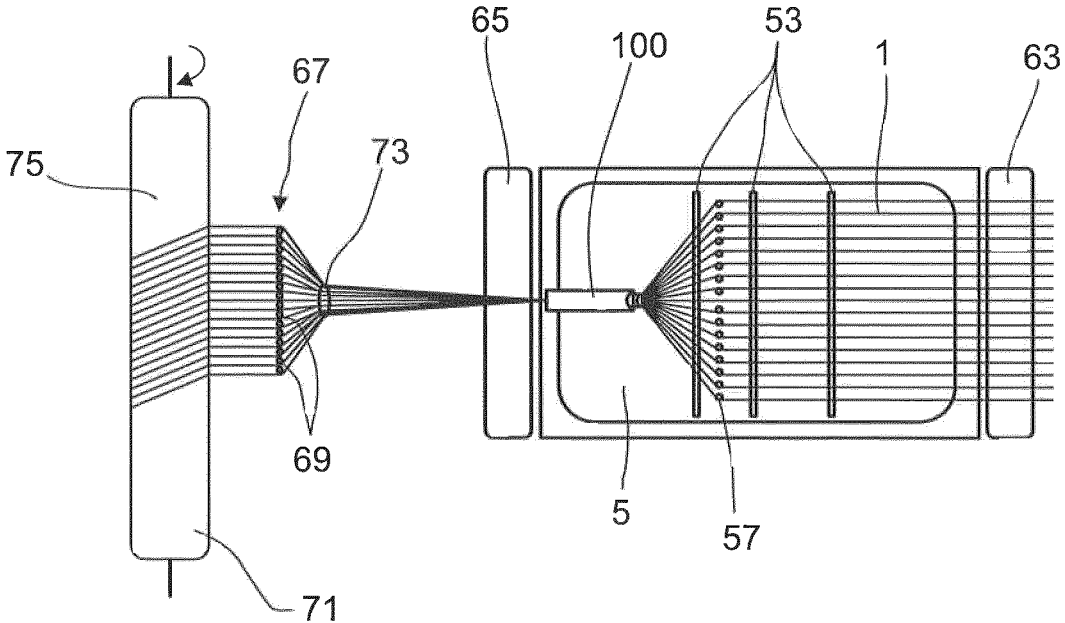
FIG. 23 shows a device for impregnating fibers, having a unit for setting the fiber content by volume, submerging into the bath, and adjoining thereto a device for producing a wound product, in the plan view.

In order to prevent that the fibers in the case of a method in which the fibers after impregnating are to be split up again form knots and an unintentional stoppage of the device thus arises, it is advantageous in the case of all embodiments for the fibers to first be placed in a simple manner from above before the fibers 1 are pressed into the matrix material in the bath 5. An entanglement of the fibers herein is prevented in that fibers are first guided through the intermediate spaces between the prongs 69 of the comb 67 and by way of the comb 7 ahead of the device for impregnating the fibers. Independently of whether the fibers are fed as individual fibers, as a group of few fibers, or as individual rovings, such as is illustrated in FIG. 23, or as a bundle, through an opening 59 for feeding fibers, or else as a bundle by way of a deflection unit 35, 63, the fibers are next placed around the deflection units 57 in the bath 5. The fibers subsequently are gathered between the deflection units 57 in the bath 5 and the comb 67 and placed into the unit for setting the fiber content by volume 100, the latter to this end being embodied in preferably two parts, having an upper part 101 and a lower part 103, or a lower part 133 and a lid 131 such that the fibers can be placed in the lower part 103, 133 and the upper part 101 or the lid 131 is subsequently placed thereon. When the guide 73 which is used in particular in the embodiment of the unit for setting the fiber content by volume having the nozzle 123 and the duct 125, is provided in order to prevent that the fibers contact the wall of the duct 125, on account of which matrix material can be wiped off, said guide 73 is likewise preferably inserted only once the fibers have been placed into the comb 67 and the fibers 1 have been placed about the deflection units 57, to which end the guide 73 is preferably likewise embodied in two parts, such that said guide 73 can be placed around the fibers 1 in an open state and can subsequently be closed. In the case of an embodiment in two parts, besides a separate upper part and a lower part, or a separate lower part and a lid, it is always also possible for the lower part and the upper part, or the lower part and the lid, to be connected by a hinge such that the lid for closing is rotated about the axis of the hinge.

When the fibers are guided through an opening 59 for feeding the fibers, the fibers after having been placed into the unit for setting the fiber content by volume are gathered between the deflection units 57 in the bath 5 and the comb 7 and placed into the opening 59 for feeding the fibers 1, said opening 59 after the fibers have been placed completely therein, being closed, for example by closing the lid 23. Of course, it is also possible here for the fibers to be first placed into the opening 59 for feeding the fibers, and thereafter into the unit for setting the fiber content by volume 100.

Depending on the number of fibers to be impregnated and on the number of fibers which are to be guided through the unit for setting the fiber content by volume 100, besides the embodiments having only one unit for setting the fiber content by volume 100 illustrated here, an arbitrary number of further units for setting the fiber content by volume can also be used. It is possible herein for a plurality of units for setting the fiber content by volume 100 to be used on a bath 5, or alternatively also for a plurality of devices for impregnating fibers 1, having in each case one unit for setting the fiber content by volume, to be used in parallel.

LIST OF REFERENCE SIGNS

1 Fibers
3 Reserve
5 Bath
7 Comb
9 Squeegee roller pair
11 Guide ring
13 Spindle
15 Component
21 Lower part
23 Lid
25 Inclined face
27 Wiper
29 Wiping edge
31 Wiper
33 Deflection unit
35 First deflection unit on lower part 21
37 Second deflection unit on lower part 21
39 Gap
41 Second gap
43 Squeegee roller
45 First deflection unit fitted to lid 23
47 Second deflection unit fitted to lid 23
49 Additional deflection unit in bath 5
51 Deflection unit
53 Wiper
53.1 Wiper acting on the fibers from above
53.2 Wiper acting on the fibers from below
55 Running direction
57 Deflection unit
59 Opening for feeding the fibers 1
61 Fiber tape
63 Deflection roller
65 Deflection roller
67 Comb
69 Prongs
71 Winding mandrel
73 Guide
75 Axis of the winding mandrel
100 Unit for setting the fiber content by volume
101 Upper part
103 Lower part
105 Clearance
107 Opening
109 Periphery of opening
111 Minimum opening cross section
113 Lateral face 115 Semicircular base
117 Plate
119 Plate
121 Lamella aperture
123 Nozzle
125 Duct
127 First arm
129 Second arm
131 Lid
133 Lower part

The invention claimed is:

1. An apparatus for impregnating fibers with a matrix material, comprising a unit for soaking the fibers with the matrix material, and a unit for setting fiber volume content which comprises at least one opening through which soaked fibers are guided wherein each opening at a minimum opening cross section thereof is dimensioned such that such an amount of the matrix material is removed such that a desired fiber volume content is achieved and the unit for setting the fiber volume content comprises an upper part and a lower part and the opening is configured in each case partially in the lower part and partially in the upper part, wherein the unit for soaking the fibers comprises a bath for receiving the matrix material and wherein the unit for setting the fiber volume content is designed and positioned such that said unit for setting the fiber volume content is submerged in the bath on a first side on which the fibers are fed and a second side on which the fibers exit from the unit for setting the fiber volume content lies outside the bath, wherein the unit for setting the fiber volume content has a nozzle with the opening having the minimum opening cross section, said nozzle protruding into the matrix material, and a duct which adjoins the nozzle and through which the soaked fibers are guided and which terminates outside the matrix material, wherein the duct has a cross-sectional face such that the soaked fibers do not contact the wall of the duct.

2. The apparatus according to claim 1, wherein the nozzle and the duct are designed in two parts, a lower part in which the fibers can be placed and a cover for closing the lower part.

3. The apparatus according to claim 1, wherein the apparatus comprises a lower part of the apparatus for impregnating in which the bath is received, and a lid for closing, wherein when the lid is fitted, in each case one gap is configured between the lid and the lower part on sides through which the fibers are guided into the apparatus and exit from the apparatus.

4. The apparatus according to claim 3, wherein the lower part of the apparatus for impregnating has a face that is inclined in the direction of the bath, the matrix material dripping from the fibers being able to run back into the bath by way of said inclined face.

5. The apparatus according to claim 1, wherein a drip unit is included, the drip unit having at least one wiper having a wiping edge the soaked fibers being guided by the wiping edge during operation.

6. The apparatus according to claim 1, wherein an inflow and an outflow for a flushing gas are included.

7. The apparatus according to claim 1, wherein a connection for a supply of matrix materials is included.

* * * * *